United States Patent
Zhang et al.

(10) Patent No.: US 12,103,129 B2
(45) Date of Patent: Oct. 1, 2024

(54) MULTI-STATION SELF-POSITIONING FLOATING CLAMPING AND WORKPIECE AUTOMATIC FLIP INTELLIGENT FIXTURE SYSTEM

(71) Applicants: QINGDAO UNIVERSITY OF TECHNOLOGY, Shandong (CN); NINGBO SANHAN ALLOY MATERIAL CO., LTD., Zhejiang (CN)

(72) Inventors: Yanbin Zhang, Qingdao (CN); Lizhi Tang, Qingdao (CN); Liang Luo, Qingdao (CN); Changhe Li, Qingdao (CN); Haizhou Xu, Qingdao (CN); Min Yang, Qingdao (CN); Huaping Hong, Qingdao (CN); Haogang Li, Qingdao (CN); Shuo Yin, Qingdao (CN); Xin Cui, Qingdao (CN); Mingzheng Liu, Qingdao (CN); Teng Gao, Qingdao (CN); Yali Hou, Qingdao (CN); Runze Li, Qingdao (CN)

(73) Assignees: QINGDAO UNIVERSITY OF TECHNOLOGY, Shandong (CN); NINGBO SANHAN ALLOY MATERIAL CO., LTD., Zhejiang (CN)

( * ) Notice: Subject to any disclaimer, the term of this patent is extended or adjusted under 35 U.S.C. 154(b) by 857 days.

(21) Appl. No.: 17/281,035

(22) PCT Filed: Feb. 6, 2020

(86) PCT No.: PCT/CN2020/074395
§ 371 (c)(1),
(2) Date: Mar. 29, 2021

(87) PCT Pub. No.: WO2021/114468
PCT Pub. Date: Jun. 17, 2021

(65) Prior Publication Data
US 2022/0118568 A1 Apr. 21, 2022

(30) Foreign Application Priority Data
Dec. 13, 2019 (CN) .......................... 201911284224.9

(51) Int. Cl.
*B23Q 3/08* (2006.01)
*B23Q 1/25* (2006.01)
(Continued)

(52) U.S. Cl.
CPC ............... *B23Q 3/082* (2013.01); *B23Q 1/25* (2013.01); *B23Q 3/18* (2013.01); *G06T 1/0014* (2013.01); *G06T 7/0004* (2013.01)

(58) Field of Classification Search
CPC .......... B23Q 3/18; B23Q 3/061; B23Q 3/082; B23Q 17/249; B23Q 1/25; B23Q 1/525; B23Q 11/10; G06T 7/0004; G06T 7/0014
See application file for complete search history.

(56) References Cited

U.S. PATENT DOCUMENTS 5,853,211 A * 12/1998 Sawdon ............... B25J 15/0226
294/203
8,082,642 B1 * 12/2011 McCulloch ............... B23C 1/12
409/211

(Continued)

FOREIGN PATENT DOCUMENTS

| CN | 104493576 A | 4/2015 |
| CN | 105922082 A | 9/2016 |

(Continued)

OTHER PUBLICATIONS

Aug. 26, 2020 International Search Report issued in International Patent Application No. PCT/CN2020/074395.
Aug. 27, 2020 Written Opinion issued in International Patent Application No. PCT/CN2020/074395.

*Primary Examiner* — Seahee Hong
(74) *Attorney, Agent, or Firm* — JCIPRNET

(57) ABSTRACT

A multi-station self-positioning floating clamping and workpiece automatic flip intelligent fixture system includes a linear motion device, a workpiece automatic flip device and a self-positioning floating clamping device. A bottom portion of the workpiece automatic flip device is connected to the linear motion device, which drives the workpiece automatic flip device to move horizontally; the self-positioning floating clamping device clamps the workpiece, the workpiece automatic flip device is arranged opposite to the (Continued)

self-positioning floating clamping device, and the workpiece automatic flip device clamps the workpiece and drives the workpiece to turn over; and the workpiece automatic flip device includes a rotary cylinder, which is connected to a hydraulic cylinder, a piston rod of the hydraulic cylinder is connected to a mechanical claw opening-and-closing finger through a hinge mechanism, and the hydraulic cylinder reciprocates to drive the mechanical claw opening-and-closing finger to open and close to clamp or release the workpiece.

9 Claims, 16 Drawing Sheets

(51) Int. Cl.
    *B23Q 3/18*     (2006.01)
    *G06T 1/00*     (2006.01)
    *G06T 7/00*     (2017.01)

(56) References Cited

U.S. PATENT DOCUMENTS

| | | | |
|---|---|---|---|
| 10,105,803 B1* | 10/2018 | Stevens | B23B 41/12 |
| 10,994,423 B2* | 5/2021 | Bettaiah | B25B 5/061 |
| 2003/0029287 A1* | 2/2003 | Judas | B23Q 3/18 |
| | | | 82/158 |
| 2004/0006295 A1* | 1/2004 | Testa, Jr. | A61F 5/0109 |
| | | | 602/26 |
| 2007/0052146 A1* | 3/2007 | Huisken | B23Q 3/062 |
| | | | 269/63 |
| 2013/0103193 A1* | 4/2013 | Roberts | B25J 9/16 |
| | | | 700/245 |
| 2018/0290250 A1 | 10/2018 | Fitzgerald et al. | |

FOREIGN PATENT DOCUMENTS

| | | |
|---|---|---|
| CN | 108326611 A | 7/2018 |
| CN | 208825601 U | 5/2019 |
| KR | 10-2009-0063413 A | 6/2009 |

\* cited by examiner

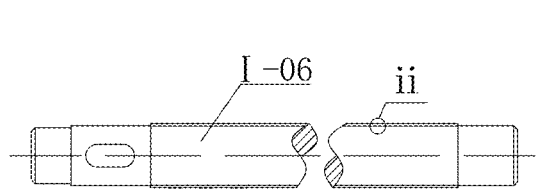
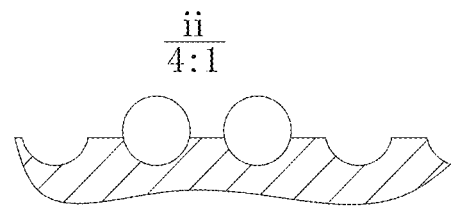
FIG. 8(a)　　　　　　　FIG. 8(b)
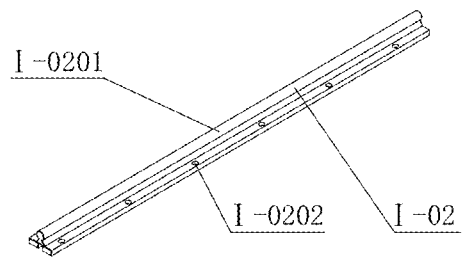
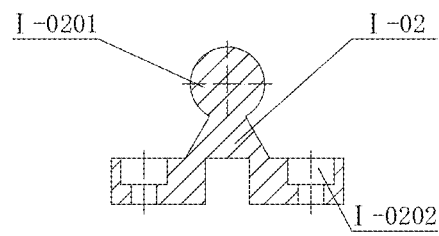
FIG. 9(a)　　　　　　　FIG. 9(b)
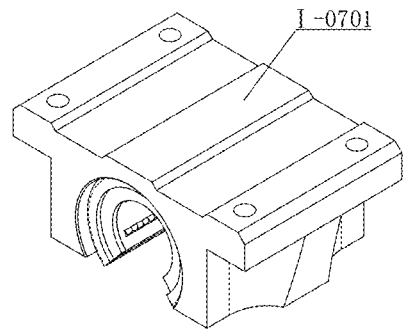
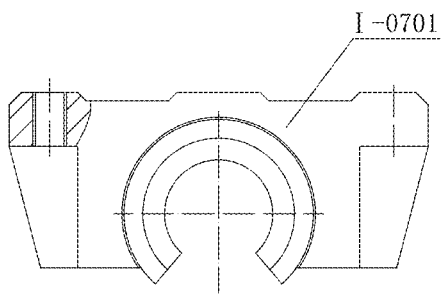
FIG. 10(a)　　　　　　FIG. 10(b)
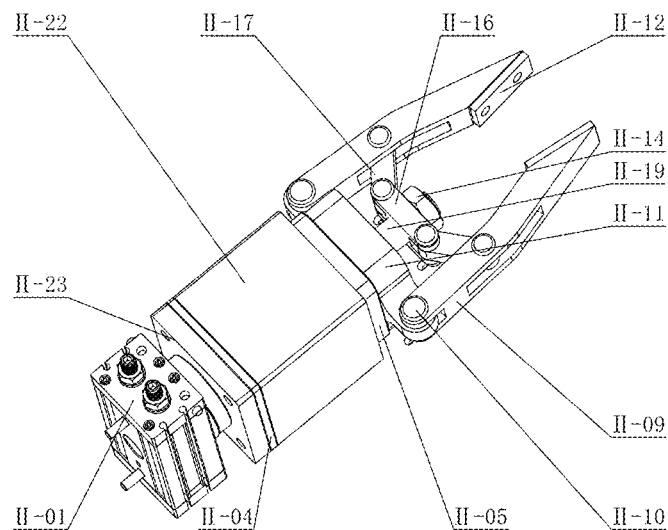
FIG. 11

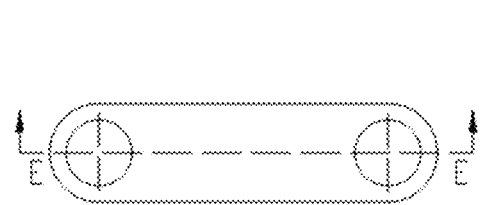
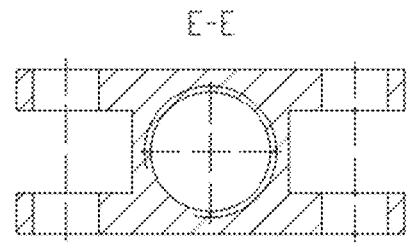
FIG. 16(b)　　　　　FIG. 16(c)
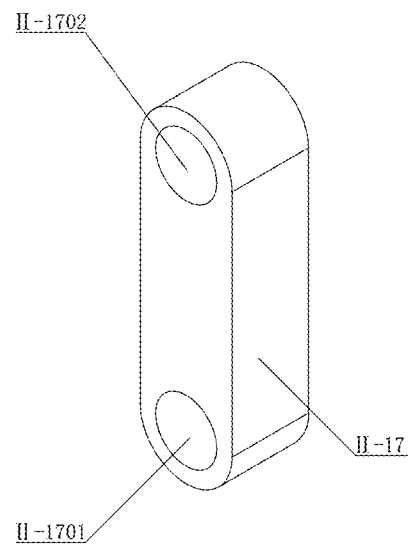
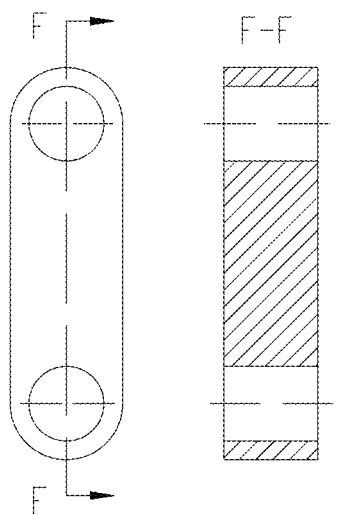
FIG. 17(a)　　　FIG. 17(b)　　FIG. 17(c)
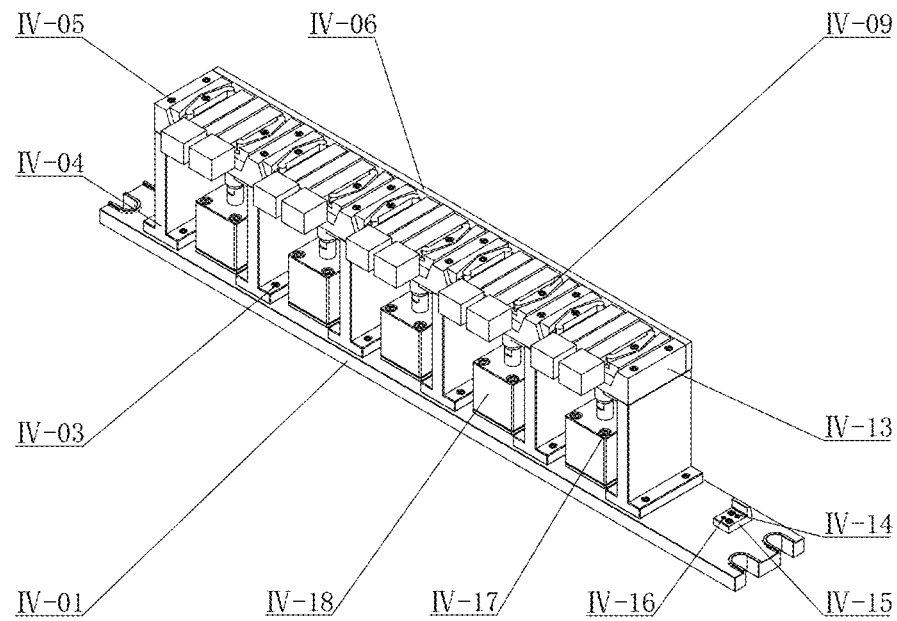
FIG. 18

MULTI-STATION SELF-POSITIONING FLOATING CLAMPING AND WORKPIECE AUTOMATIC FLIP INTELLIGENT FIXTURE SYSTEM

BACKGROUND

Technical Field

The present disclosure belongs to the field of process equipment technologies, and particularly relates to a self-positioning fixture used in machining a turning tool plane, in particular to a multi-station self-positioning float clamping and workpiece automatic flip intelligent fixture system.

Related Art

A turning tool is a tool with a cutting part for turning. The turning tool is one of the most widely used tools in cutting, and is also a basis of studying and analyzing all kinds of tools. The turning tool is used in all kinds of lathes for machining outer circles, inner holes, end faces, threads, turning grooves, and the like. A working part of the turning tool is a part for generating and processing cuttings, and includes a cutting edge, a structure for breaking or rolling the cuttings, a space for discharging or storing the cuttings, a passage of a cutting fluid, and other structural elements. A cutting part of the turning tool consists of a main cutting edge, an auxiliary cutting edge, a rake face, a main flank face and an auxiliary flank face, and a nose angle. Combination modes of the cutting part and a handle (i.e., a clamping part) of the turning tool mainly include an integral type, a welding type, a mechanical clamping type, and a welding-mechanical clamping type. A mechanical clamping-type turning tool may avoid a stress and a crack of a cemented carbide blade during high-temperature welding, and the handle can be used for many times. A blade of the mechanical clamping-type turning tool is generally clamped by using a screw and a pressing plate. For a mechanical clamping-type turning tool provided with an indexable blade, the blade may be indexed and used continuously after a cutting edge is blunt. Moreover, there is a short time of stopping the lathe and changing the turning tool, thus making rapid development.

There are many stations and processes in machining of the turning tool, and different fixtures are arranged for different stations to position and clamp a workpiece.

A device used for fixing a machining object during mechanical manufacturing to make the machining object occupy a correct position so as to be constructed or detected is also called a clamp. Broadly speaking, a device used for installing the workpiece quickly, conveniently and safely in any procedure during a process can be called the fixture, such as a welding fixture, an inspection fixture, an assembly fixture, a machine tool fixture, and the like. The machine tool fixture is most common, and is often referred to as the fixture for short. When the workpiece is machined on the machine tool, in order to make a surface of the workpiece meet technical requirements such as a size, a geometric shape, a mutual position accuracy with other surfaces, and the like specified in a drawing, the workpiece must be installed (positioned) and fixed (clamped) before machining. The fixture is usually composed of a positioning element (for determining the correct position of the workpiece in the fixture), a clamping device, a tool setting guiding element (for determining relative positions of the tool and the workpiece or guiding a direction of the tool), an indexing device (for enabling the workpiece to finish machining at several stations in one installation, including a rotary indexing device and a linear-movement indexing device), a connecting element, a fixture body (a fixture base), and the like. According to use characteristics, the fixtures can be divided into the following types. A universal fixture, such as a machine vice, a chuck, a sucker, an index head, a rotary table, and the like, has a great universality and can better adapt to transformation of a machining procedure and a machining object, with a finalized structure, and serialized size and specification, and most of the universal fixtures have become a standard accessory of the machine tool. A special fixture is specially designed and manufactured for a clamping need of a certain product part in a certain procedure, serves a specific object, has a strong pertinence, and is generally designed by a product manufacturer itself. Commonly used special fixtures include a lathe fixture, a milling machine fixture, a drilling jig (a machine tool fixture for guiding the tool to drill or ream a hole in the workpiece), a boring jig (a machine tool fixture for guiding a boring tool bar to bore a hole in the workpiece), and a follow fixture (a mobile fixture for combining an automatic line of the machine tool). An adjustable fixture is a special fixture capable of replacing or adjusting an element. A combined fixture is a fixture composed of standardized elements with different shapes, specifications, and uses, and is suitable for trial production of new products, single-piece and small-batch production with products replaced frequently, and a temporary task.

Clamping mechanisms commonly used in the fixture include an inclined wedge clamping mechanism, a spiral clamping mechanism, an eccentric clamping mechanism, a hinge clamping mechanism, a lever clamping mechanism, and the like, wherein the inclined wedge clamping mechanism mainly uses a pressure generated by a movement of an inclined plane to clamp the workpiece. A working principle of the inclined wedge clamping mechanism is as follows: the workpiece is loaded, and a big end of an inclined wedge is knocked to clamp the workpiece; and after machining, a small end of the inclined wedge is knocked to loosen the workpiece. The inclined wedge clamping mechanism is seldom used alone in production. However, a clamping mechanism composed of the inclined wedge and other mechanisms is widely used in production.

In addition, since there is always a position error between clamping points on the workpiece, in order to clamp the workpiece reliably or realize multi-point clamping, the clamping mechanism or a supporting part is generally required to have a function of floating self-positioning, and a floating clamping link enables each clamping point to obtain an even clamping force. When a rigid clamping mechanism is used, a stress of each workpiece will be uneven due to a manufacturing error of the workpiece. If a floating clamping mechanism is used, the workpiece will be clamped evenly.

Bo Gong, Genfu Xu, and Yongliang Xie of ShenZhen JPT Opto-electronics Co., Ltd., invents an edge positioning fixture, which includes a bearing mechanism, a direction adjusting mechanism installed on the bearing mechanism, a limit cover plate installed on the direction adjusting mechanism, a clamping mechanism installed on the direction adjusting mechanism, and a plurality of pressing plate assemblies, wherein the limit cover plate and the clamping mechanism are provided with the pressing plate assemblies; the bearing mechanism includes a base and a main bearing member installed in the base; the direction adjusting mechanism includes a rotating frame, a driving assembly, a transmission adjusting member installed on the rotating frame, and a first elastic member connected to the rotating frame; the rotating frame is connected to the base through the main bearing member; and the other end of the first elastic member is connected to the base. According to the edge positioning fixture of the invention, a direction of the limit cover plate is finely adjusted by the direction adjusting mechanism after a substrate is pressed between the pressing plate assemblies, so that the edge positioning mechanism could accurately adjust a direction of the substrate after long-term use so as to meet machining requirements. However, the fixture had only one station, so that a machining efficiency is low, a structure thereof is complex, and a workpiece positioning accuracy is not high enough.

Yansong Yu of Shenzhen Yomijia Automation Equipment Co., Ltd., invents a universal positioning fixture, which includes a fixture base and a linkage positioning mechanism pivoted with the fixture base, wherein the linkage positioning mechanism includes two first parallelogram linkage mechanisms symmetrically arranged on both sides of a Y axis of the fixture base, two second parallelogram linkage mechanisms symmetrically arranged on both sides of an X axis of the fixture base, and a plurality of positioning connecting rods transversely arranged between the two first parallelogram linkage mechanisms and longitudinally arranged between the two second parallelogram linkage mechanisms for forming a workpiece positioning frame; when the first parallelogram linkage mechanisms and the second parallelogram linkage mechanisms rotate reversely around a pivot shaft, the workpiece is clamped by the workpiece positioning frame; and when the first parallelogram linkage mechanisms and the second parallelogram linkage mechanisms rotate forwardly around the pivot shaft, the workpiece is separated from the workpiece positioning frame. With this structural design, workpiece positioning is accurate, convenient in operation, and strong in universality. The advantages of improving a positioning accuracy, stabilizing clamping, and reducing deformation of the workpiece are realized, but the above technical solution still had the disadvantages of complicated structure, single station only, low production efficiency, and the like.

Huisheng Qiu and Bo Chen of Lansi Intelligent Robot (Changsha) Co., Ltd., invents a positioning fixture, which includes a positioning platform for supporting the workpiece; a positioning flange arranged on the positioning platform and used for laterally limiting the workpiece; and a movable positioning block arranged opposite to the positioning flange to clamp the workpiece, wherein the movable positioning block can be far away from the positioning flange under an action of an external force and can press the workpiece when the external force is removed. When in use, the workpiece is placed between the positioning flange and the movable positioning block, and the movable positioning block can be pressed against the workpiece to realize accurate positioning of the workpiece. Meanwhile, the movable positioning block is matched with the positioning flange to clamp the workpiece, so that the workpiece is always kept at a correct position. When the workpiece needs to be taken and placed, the external force may be applied to the movable positioning block to make the movable positioning block far away from the positioning flange, so as to increase a distance between the movable positioning block and the positioning flange, thus being convenient for taking and placing the workpiece. Compared with manual auxiliary positioning of the workpiece in the prior art, the positioning fixture can accurately position the workpiece and ensure the correct position of the workpiece, but a clamping efficiency of the fixture is low and the clamping is not stable enough.

Jianxia Liu of Guangdong Changying Precision Technology Co., Ltd., invents a fixture and a positioning mechanism thereof, wherein the fixture includes a base, a first cylinder, a second cylinder, an air inlet pipe, and an air outlet pipe. The positioning mechanism includes a positioning body, a first spring, a first positioning post, and a second positioning post. The positioning body is provided with a positioning groove, and the first spring is sleeved on the first positioning post. When the workpiece is placed on a positioning plate of the fixture, the workpiece is arranged on the other end of the second positioning post by penetrating through a positioning hole in the workpiece. Since a diameter of the other end of the second positioning post is gradually decreased along a direction away from the first positioning post, the second positioning post can adapt to various positioning holes with different sizes, so as to improve an adaptability of the positioning mechanism and improve a matching degree between the positioning mechanism and the positioning hole. A side wall of the positioning hole of the workpiece abuts against an outer periphery of the second positioning post, and when the pressing plate exerts a pressure on the workpiece, the workpiece exerts a pressure on the second positioning post, thus pressing the first spring, so that the first spring is compressed, which further reduces a distance between the workpiece and a positioning surface of the positioning plate. Multiple cylinders are used in the fixture for clamping, with a quick response and a high clamping efficiency. However, when the workpiece is clamped by six lever cylinders, clamping forces may be inconsistent. In addition, the spring is used for adjusting the support, so that the clamping is not reliable;

Wei Wen, Meiliang Zhu, and Junhua Cha of Shanghai Xiuzhuo Automation Equipment Co., Ltd., invents a self-centering fixture, which includes an upper plate and a lower plate, wherein the upper plate is located on the lower plate, a workpiece positioning structure is arranged at an upper end of the upper plate, a steel ball customization plate is arranged between the upper plate and the lower plate, a plurality of steel balls are installed on the steel ball customization plate, and floating ball centering devices are arranged in the upper plate and the lower plate. The workpiece is accurately positioned by the workpiece positioning structure at the upper end of the upper plate, so that the workpiece may be easily placed and fixed on the upper end of the upper plate. The floating ball centering devices are installed in the upper plate and the lower plate, and centering adjustment of the workpiece by floating steel balls is realized through the floating ball centering devices, so that the workpiece is located at a center of the fixture, thus avoiding occurrences of an improper assembly position and a damage caused by pressing the workpiece. An assembly accuracy and an assembly efficiency of an automatic assembly station are greatly improved by the self-centering positioning fixture, which is simple in structure, strong in practicability, and easy to use and popularize, but self-positioning by floating balls and a spring might lead to inaccurate positioning.

Yong Liu and Kehui Qu of Tianchang Cylinder Cover Co., Ltd., invents a self-detecting two-pin positioning fixture, which includes a fixture body, a first positioning pin, a second positioning pin, a first sensor, a second sensor, a third sensor, a fourth sensor, a first solenoid valve, a second solenoid valve, a compressed air supply unit, a first warning device, and a second warning device, wherein the fixture body is provided with a first pin hole and a second pin hole, and the first pin hole and the second pin hole are respectively provided with a first vent hole and a second vent hole; the first vent hole and the second vent hole are respectively connected to the compressed air supply unit through the first solenoid valve and the second solenoid valve; the first sensor and the third sensor are respectively used for detecting assembly conditions of the workpiece with the first positioning pin and the second positioning pin; the first warning device and the second warning device are respectively used for warning; and the second sensor and the fourth sensor are respectively use for detecting cleaning conditions of surfaces of the first positioning pin and the second positioning pin. The invention had accurate positioning and a good reliability. However, this fixture is too complicated, and had no self-positioning clamping function for the workpiece.

The above technical solutions partially realize the advantages of improving a positioning accuracy, stabilizing clamping and reducing deformation of the workpiece. However, the above technical solutions still have the disadvantages of complicated structure, single station only, low production efficiency, poor practicability, difficulty in popularization and use, and the like.

SUMMARY

An objective of the present disclosure is to provide a multi-station self-positioning floating clamping and workpiece automatic flip intelligent fixture system to overcome the above-mentioned shortcomings of the prior art. The system has the functions of self-positioning clamping and automatic flip over of workpieces, and can realize self-positioning clamping of tools in the machining process through the self-positioning floating clamping assembly, so as to avoid a phenomenon that the workpiece is not tightly clamped or leave a positioning position due to torque generated by surface errors of forgings and dimensional errors among different forgings. In addition, the fixture system has multiple stations, which can process multiple workpieces at the same time and improve production efficiency; when one procedure is finished, a status of the workpiece can be intelligently identified by a machine vision identification system, and then sends out an instruction through a computer to make a workpiece automatic flip system automatically turn over the workpiece to facilitate machining next procedure.

An invention objective of the present disclosure is to provide a multi-station self-positioning floating clamping and workpiece automatic flip intelligent fixture system. To achieve the above objective, the present disclosure employs the following technical solutions.

A multi-station self-positioning floating clamping and workpiece automatic flip intelligent fixture system, includes a linear motion device, a workpiece automatic flip device, and a self-positioning floating clamping device, wherein:
  a bottom of the workpiece automatic flip device is connected to the linear motion device, and the linear motion device drives the workpiece automatic flip device to move horizontally;
  the self-positioning floating clamping device clamps the workpiece, the workpiece automatic flip device is arranged opposite to the self-positioning floating clamping device, and the workpiece automatic flip device is capable of clamping the workpiece and driving the workpiece to turn over; and
  the workpiece automatic flip device includes a rotary cylinder, the rotary cylinder is connected to a hydraulic cylinder, a piston rod of the hydraulic cylinder is connected to a mechanical claw opening-and-closing finger through a hinge mechanism, and the hydraulic cylinder reciprocates to drive the mechanical claw opening-and-closing finger to open and close to clamp or release the workpiece.

As a further technical solution, two mechanical claw opening-and-closing fingers are provided, the two mechanical claw opening-and-closing fingers are oppositely arranged, the hinge mechanism is connected to a middle portion of the mechanical claw opening-and-closing finger, an end portion of the mechanical claw opening-and-closing finger is hinged to a hinge securing plate, and the hinge securing plate is secured to the hydraulic cylinder; the hinge mechanism includes a hollow hinge buckle secured to a piston rod, two ends of the hollow hinge buckle are hinged with a hinge buckle, and an end portion of the hinge buckle is hinged with the middle portion of the mechanical claw opening-and-closing finger.

As a further technical solution, the mechanical claw opening-and-closing finger is a rod-shaped structure with a folded angle, a clamping end of the mechanical claw opening-and-closing finger is a wedge-shaped surface, and a cushion is fixedly arranged at the clamping end of the mechanical claw opening-and-closing finger.

As a further technical solution, the self-positioning floating clamping device includes a fixture bottom plate, a plurality of supporting plates are secured on the fixture bottom plate, a top portion of the supporting plate is fixedly connected to a fixture main plate, the fixture main plate is provided with a plurality of clamping stations, and every two clamping stations are provided with one floating clamping assembly, and the floating clamping assembly clamps or releases the workpiece.

As a further technical solution, the floating clamping assembly includes a vertically arranged pull rod, a bottom portion of the pull rod is connected to the hydraulic cylinder, a top portion of the pull rod is hinged with a connecting plate, two ends of the connecting plate are hinged with vertical connecting rods, a top portion of each connecting rod is fixedly connected to a floating clamping base, the two floating clamping bases are oppositely arranged, and opposite sides of the floating clamping bases are each provided with a floating clamping block, the floating clamping blocks are capable of rotating around a joint with the floating clamping base, and the two floating clamping blocks clamp the workpiece.

As a further technical solution, the floating clamping block is horizontally arranged, and two ends of the floating clamping block are each provided with a semicircular boss; an external side face of the floating clamping base is an inclined wedge surface, the fixture main plate is provided with a plurality of bumps, side surfaces of which are inclined wedge surfaces and are in contact fit with the inclined wedge surface of the floating clamping base.

As a further technical solution, the self-positioning floating clamping device includes a bottom plate, one end of the bottom plate is fixedly provided with a positioning supporting assembly and the other end of the bottom plate is provided with a floating pressing assembly, a plurality of positioning and floating clamping assemblies are arranged between the positioning supporting assembly and the floating pressing assembly, adjacent positioning and floating clamping assemblies clamp the workpiece, the floating pressing assembly is connected to the hydraulic cylinder, a linear guide rail is arranged on the bottom plate, and the positioning and floating clamping assembly and the floating pressing assembly are capable of moving horizontally along the linear guide rail.

As a further technical solution, the positioning and floating clamping assembly includes a linear bearing pedestal matched with the linear guide rail, a positioning plate is fixedly arranged on a top portion of the linear bearing pedestal, a side portion of the positioning plate is connected to the floating clamping block, and the floating clamping block is capable of rotating around a joint with the positioning plate.

As a further technical solution, the linear motion device includes a lower bottom plate, the lower bottom plate is provided with a linear guide rails and a ball screw in parallel, bottom portions of a plurality of parallel linear motion assemblies are connected to the linear guide rail and the ball screw, and the ball screw is connected to a servo motor; and each of the linear motion assemblies is connected to the workpiece automatic flip device.

As a further technical solution, a machine vision system is further included, wherein the machine vision system includes an industrial camera arranged above the self-positioning floating clamping device, the industrial camera is connected to an image acquisition card, the image acquisition card is connected to an industrial computer, the industrial camera collects image information of the workpiece and transmits the image information to the image acquisition card, the image acquisition card transmits the image information to the industrial computer, the industrial computer analyzes and processes the image information, determines a status of the workpiece, and controls the linear motion device, the workpiece automatic flip device and the self-positioning floating clamping device to operate.

Beneficial effects of the present disclosure are as follows:

According to the self-positioning floating clamping assembly of the present disclosure, firstly, the inclined wedge clamping mechanism is adopted, and the clamping block has a certain range of travel; secondly, both the floating clamping block and the floating clamping base can be freely replaced; when the floating clamping block and the floating clamping base are greatly worn or workpieces with different sizes and specifications are processed, sizes of the floating clamping block and the floating clamping base can be freely adjusted and replaced, so that workpieces with various sizes and specifications can be clamped.

According to the workpiece automatic flip device of the present disclosure, after one machining procedure is completed, the computer can automatically turn the workpiece to another machining procedure by analyzing the images collected by the industrial camera, thereby reducing participation of workers in the machining process, greatly ensuring the safety of the workers and improving the production efficiency of the workpieces.

The fixture system of the present disclosure integrates the machine vision system, and the industrial camera arranged on an upper portion of a fixture body transmits acquired image information to the computer, and the computer system is capable of determining the posture and status of the workpiece on the fixture body through image processing, and then sends instructions to the self-positioning floating clamping device, the workpiece automatic flip device and the linear motion device to clamp, release and turn over the workpiece.

BRIEF DESCRIPTION OF THE DRAWINGS

The accompanying drawings constituting a part of this application are used for providing further understanding for this application. Exemplary embodiments of this application and descriptions thereof are used for describing this application and do not constitute any inappropriate limitation to this application.

FIG. 8(a) is a front view of a ball screw;

FIG. 8(b) is a partial enlarged view of a part ii in FIG. 8(a);

FIG. 9(a) is an axonometric drawing of a linear guide rail;

FIG. 9(b) is a sectional view of the linear guide rail;

FIG. 10(a) is an axonometric drawing of a linear bearing pedestal;

FIG. 10(b) is a partial sectional view of the linear bearing pedestal;

FIG. 11 is an axonometric drawing of a workpiece automatic flip device;

FIG. 16(b) is a top view of the hollow hinge buckle;

FIG. 16(c) is an E-E sectional view of FIG. 16(b);

FIG. 17(a) is an axonometric drawing of a hinge buckle;

FIG. 17(b) is a top view of the hinge buckle;

FIG. 17(c) is an F-F sectional view of FIG. 17(b);

FIG. 18 is an axonometric drawing of a self-positioning floating clamping device according to a first embodiment;

Figure 1:
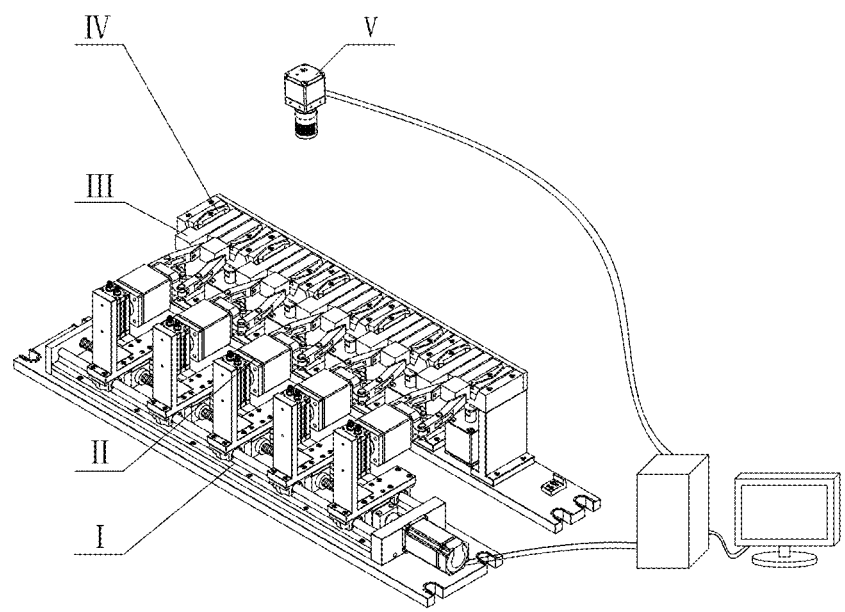
FIG. 1 is an axonometric drawing of a fixture system.

I-01 refers to a lower bottom plate of a linear motion system, I-02 refers to a linear guide rail, I-03 refers to a left baffle, I-04 refers to a hexagon socket head cap screw, I-05 refers to a standard spring washer, I-06 refers to a ball screw, I-07 refers to a linear motion assembly, I-08 refers to a coupler, I-09 refers to a servo motor, I-10 refers to a right baffle, I-11 refers to a supporting rack, and I-12 refers to a lower bottom plate of the linear motion system;

I-0201 refers to a linear guide rail cylinder, and I-0202 refers to a countersunk hole of the linear guide rail;

I-0701 refers to a linear bearing pedestal, I-0702 refers to a hexagon socket head cap screw, I-0703 refers to a hexagon socket head cap screw, I-0704 refers to a vertical plate, I-0705 refers to a stiffening plate, I-0706 refers to a hexagon socket head cap screw, I-0707 refers to a hexagon socket head cap screw, I-0708 refers to a standard spring washer, I-0709 refers to a horizontal plate, I-0710 refers to a ball cyclic returning device, and I-0711 refers to a supporting block;

II-01 refers to a rotary cylinder, II-02 refers to a hexagon socket head cap screw, II-03 refers to a hexagon socket head cap screw, II-04 refers to a bottom plate of a thin-type hydraulic cylinder, II-05 refers to a connecting plate of the mechanical claw, II-06 refers to a locking nut, II-07 refers to a piston, II-08 refers to a cylinder body sealing ring, II-09 refers to a mechanical claw opening-and-closing finger, II-10 refers to a pin shaft, II-11 refers to a hinge securing plate, II-12 refers to a cushion, II-13 refers to a hexagon socket head cap screw, II-14 refers to a hexagon nut, II-15 refers to a hexagon socket head cap screw, II-16 refers to a hollow hinge buckle, II-17 refers to a hinge buckle, II-18 refers to a cotter pin, II-19 refers to a piston rod, II-20 refers to a piston rod sealing ring, II-21 refers to a sealing ring at the bottom of the cylinder, II-22 refers to a cylinder block, II-23 refers to a rotary connecting plate, and II-24 refers to a standard spring washer;

II-0901 refers to a front pin hole, and II-0902 refers to a rear pin hole;

II-1101 refers to an axle hole, II-1102 refers to a countersunk hole, and II-1103 refers to a pin hole;

II-1601 refers to a left pin hole, II-1602 refers to a threaded hole, and II-1603 refers to a right pin hole;

II-1701 refers to an upper pin hole, and II-1702 refers to a lower pin hole;

IV-01 refers to a fixture bottom plate, IV-02 refers to a standard spring washer, IV-03 refers to a hexagon socket head cap screw, IV-04 refers to a supporting plate, IV-05 refers to a hexagon socket head cap screw, IV-06 refers to a rear plate, IV-07 refers to a standard spring washer, IV-08 refers to an A-type support nail, IV-09 refers to a floating clamping assembly, IV-10 refers to a C-type support nail, IV-11 refers to a hexagon socket head cap screw, IV-12 refers to a standard spring washer, IV-13 refers to a fixture main plate, IV-14 refers to a hexagon socket head cap screw, IV-15 refers to a feeler block, IV-16 refers to a positioning pin, IV-17 refers to a hexagon socket head cap screw, IV-18 refers to a thin-type hydraulic cylinder, and IV-19 refers to a standard spring washer;

IV-0401 refers to a countersunk hole of the supporting plate, and IV-0402 refers to a threaded hole of the supporting plate;

IV-0901 refers to a pin shaft, IV-0902 refers to a connecting rod, IV-0903 refers to a standard spring washer, IV-0904 refers to a floating clamping block, IV-0905 refers to a hexagon socket head cap screw, IV-0906 refers to a floating clamping base, IV-0907 refers to a cotter pin, IV-0908 refers to a connecting plate, and IV-0909 refers to a pull rod;

IV-1301 refers to a through hole, IV-1302 refers to a connecting hole, IV-1303 refers to a connecting hole, and IV-1304 refers to a threaded hole;

VI-01 refers to a bottom plate, VI-02 refers to a positioning supporting assembly, VI-03 refers to a positioning and floating clamping assembly, VI-04 refers to a floating pressing assembly, VI-05 refers to a T-shaped bolt, VI-06 refers to a hydraulic cylinder, and VI-07 refers to a linear guide rail;

VI-0201 refers to a connecting block, VI-0202 refers to a positioning plate, VI-0203 refers to a baffle, VI-0204 refers to a C-type support nail, VI-0205 refers to a hexagon socket head cap screw, VI-0206 refers to an A-type support nail, and VI-0207 refers to a cover plate;

VI-0301 refers to a cover plate, VI-0302 refers to a cylindrical pull rod, VI-0303 refers to a hexagon socket head cap screw, VI-0304 refers to a floating clamping base, VI-0305 refers to a floating clamping block, VI-0306 refers to a cotter pin, VI-0307 refers to a pin shaft, VI-0308 refers to a baffle, VI-0309 refers to a support nail, VI-0310 refers to a hexagon socket head cap screw, VI-0311 refers to a positioning plate, VI-0312 refers to a hexagon socket head cap screw, and VI-0313 refers to a linear bearing pedestal; and VI-0401 refers to a linear bearing pedestal, VI-0402 refers to a cylindrical pull rod, VI-0403 refers to a stiffening plate, VI-0404 refers to a floating clamping block, VI-0405 refers to a floating clamping base, VI-0406 refers to a back plate, VI-0407 refers to a cover plate, VI-0408 refers to a cross countersunk screw, VI-0409 refers to a first hinge buckle, VI-0410 refers to a pin shaft, and VI-0411 refers to a second hinge buckle.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof;

For convenience of description, the words "above", and "below" appearing in the present disclosure only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present disclosure.

As introduced in the background art, the inventors found that a clamping effect of the existing special fixture in a turning tool manufacturing process is not ideal, and there are many shortcomings such as unreliable clamping, inaccurate positioning, few stations, uneven clamping force and low production efficiency. In order to solve the above technical problems, this application proposes a multi-station self-positioning floating clamping and workpiece automatic flip intelligent fixture system.

Embodiment 1

The fixture system disclosed in this embodiment will be further described with reference to FIG. 1 to FIG. 26(*b*) hereinafter.

As shown in FIG. 1, the multi-station self-positioning floating clamping and workpiece automatic flip intelligent fixture system consists of four parts including a linear motion device I, a workpiece automatic flip device II, a self-positioning floating clamping device IV, and an industrial camera V. The linear motion device I is arranged below the workpiece automatic flip device II and drives the workpiece automatic flip device to move horizontally. A workpiece III is placed on each station of the self-positioning floating clamping device IV, and the self-positioning floating clamping device IV is arranged relatively parallel to the linear motion device I and the workpiece automatic flip device II. The linear motion device I and the self-positioning floating clamping device IV are fixed on a workbench of a milling machine through T-shaped bolts. A rotary cylinder II-01 is connected to a vertical plate I-0704 through a hexagon socket head cap screw. By fixing the rotary cylinder II-01 on the vertical plate I-0704, a connection between the linear motion device I and the workpiece automatic flip device II is realized. The industrial camera V is secured above the milling machine.

Figure 2:
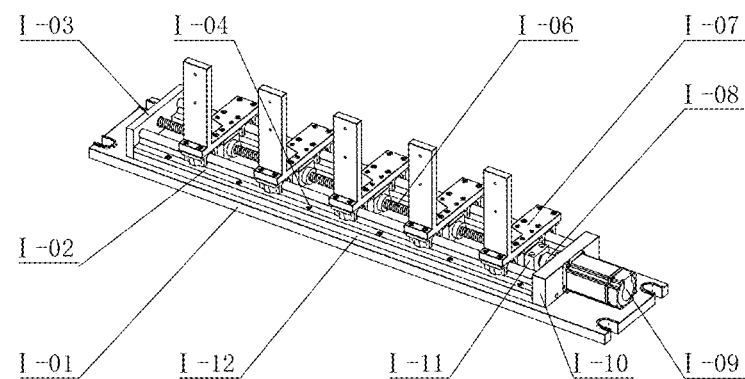
FIG. 2 is an axonometric drawing of a linear motion device.
Figure 3:
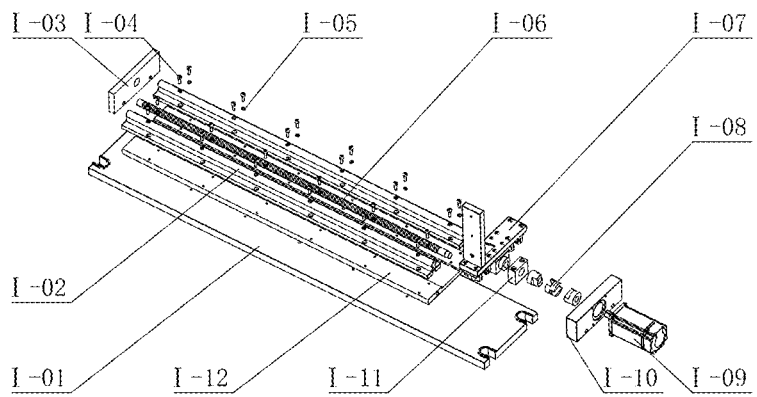
FIG. 3 is an exploded view of the linear motion device.

This embodiment discloses the linear motion device, as shown in FIG. 2 and FIG. 3, a lower bottom plate I-01 of a linear motion system is connected to the workbench of the milling machine through a T-shaped bolt and a hexagon nut, a head of the T-shaped bolt passes through a T-shaped groove of the workbench of the milling machine, and a threaded part of the T-shaped bolt passes through four U-shaped grooves of the lower bottom plate I-01 of the linear motion system and is secured by the hexagonal nut. A lower bottom plate I-12 of the linear motion system is secured onto the lower bottom plate I-01 of the linear motion system, and threaded holes on the lower bottom plate I-12 of the linear motion system and 12 countersunk holes I-0202 of a linear guide rail symmetrically placed on a linear guide rail I-02 are connected and secured with standard spring washers I-05 through hexagon socket head cap screws I-04. A left baffle I-03 is connected to the linear guide rail I-02 through a hexagon socket head cap screw. A ball screw I-06 passes through holes of the left baffle I-03 and a supporting rack I-11 to play a holding role. The ball screw I-06 and a coupler I-08 as well as a servo motor I-09 and the coupler I-08 are all connected by a flat key. The servo motor I-09 is secured to a right baffle I-10, and the servo motor I-09 transmits power to the ball screw I-06 through the coupler I-08 to drive the ball screw I-06 to rotate.

Figure 4:
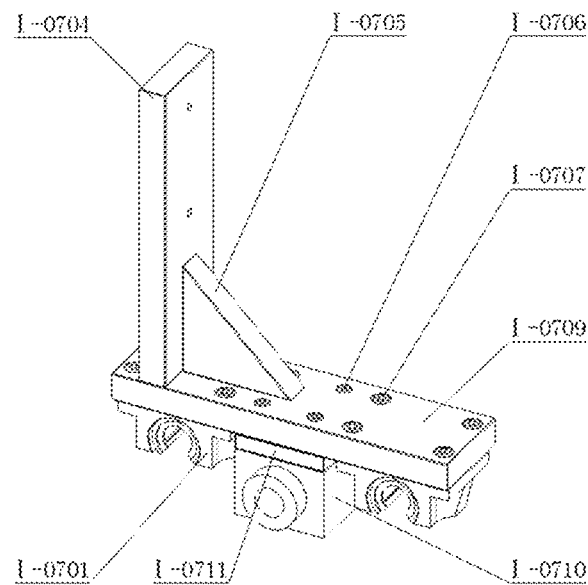
FIG. 4 is an axonometric drawing of a linear motion assembly.
Figure 5:
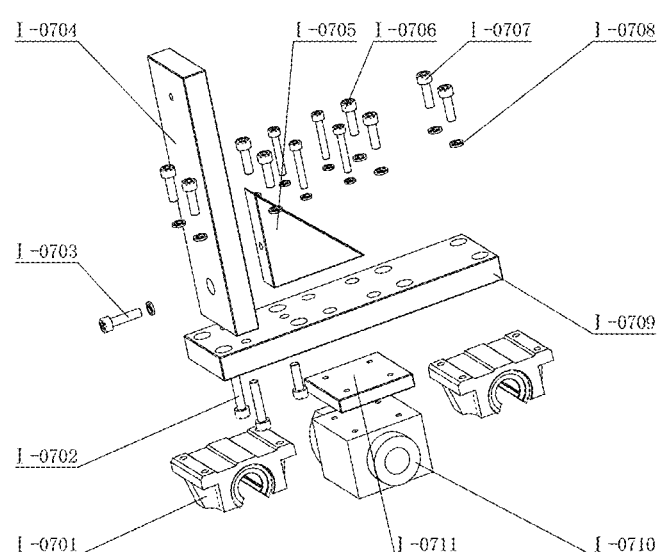
FIG. 5 is an exploded view of the linear motion assembly.

As shown in FIG. 4 and FIG. 5, a linear motion assembly I-07 is sleeved on a linear guide rail cylinder I-0201 through a linear bearing pedestal I-0701, and the linear motion assembly I-07 is installed in the linear motion device I in this way. Two threaded holes are arranged below a horizontal plate I-0709, and two countersunk holes are arranged at corresponding places of the vertical plate I-0704. The vertical plate I-0704 and the horizontal plate I-0709 are connected by a hexagon socket head cap screw I-0702. After the vertical plate I-0704 is connected to the horizontal plate I-0709, the structure is unstable, which needs to be strengthened and supported by a stiffening plate I-0705. The stiffening plate I-0705 has two threaded holes on a left side and a lower side respectively, and the vertical plate I-0704 and the horizontal plate I-0709 corresponding to the stiffening plate I-0705 have countersunk holes at corresponding positions, which are connected through a hexagon socket head cap screw I-0703 and the hexagon socket head cap screw I-0702. A ball cyclic returning device I-0710, a supporting block I-0711 and the horizontal plate I-0709 are connected to standard spring washers I-0707 through four pairs of hexagon socket head cap screws I-0706. The ball screw I-06 passes through the ball cyclic returning device I-0710, and the ball screw I-06 rotates to generate a thrust on the ball cyclic returning device I-0710 to push the ball cyclic returning device I-0710 to displace and drive the linear motion assembly I-07 to move at the same time. Therefore, as a unit, the linear motion assembly I-07 can realize horizontal movement in the linear motion device I, and translation of the workpiece automatic flip device between two adjacent stations can be realized through the rotary drive of the ball screw.

Figure 6A:
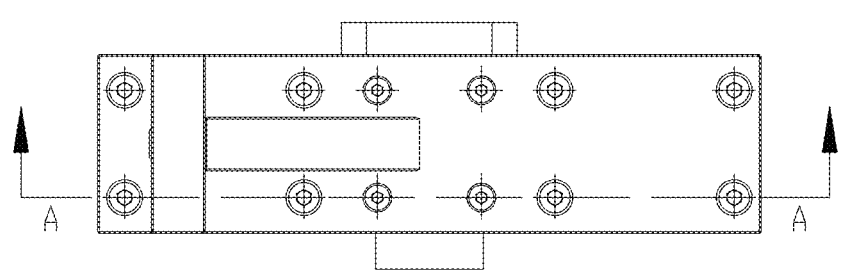
FIG. 6(a) is a top view of the linear motion assembly.
Figures 6B, 6C:
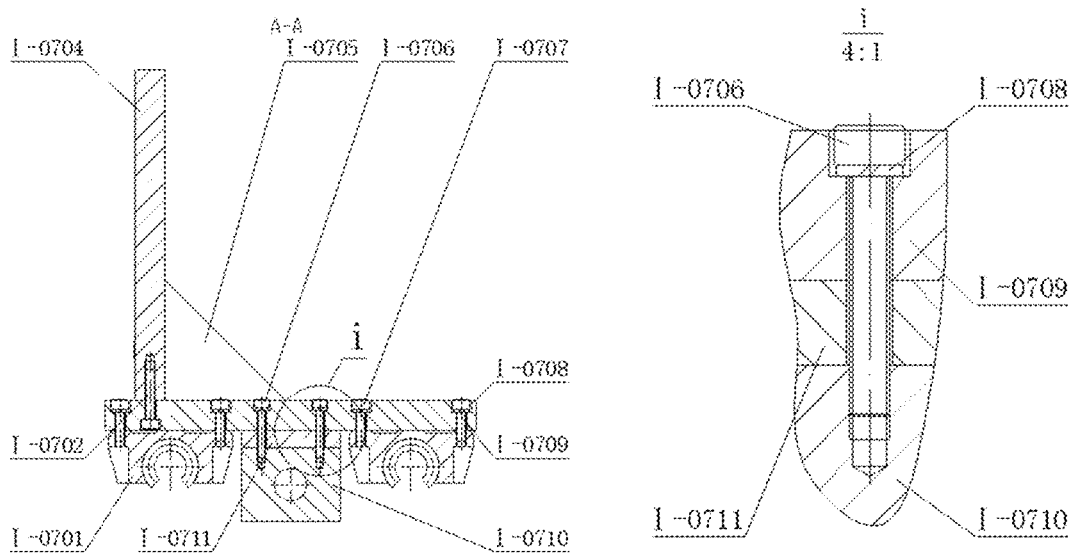
FIG. 6(b) is an A-A sectional view of FIG. 6(a)
FIG. 6(c) is a partial enlarged view of a part i in FIG. 6(b)

As shown in FIG. 6(*a*), FIG. 6(*b*) and FIG. 6(*c*), a threaded hole of the linear bearing pedestal I-0701 is a through hole, and the horizontal plate I-0709 and the linear bearing pedestal I-0701 are connected to a standard spring washer I-0708 through a hexagon socket head cap screw I-0707. The standard spring washer I-0708 can prevent the hexagon socket head cap screw I-0707 from loosening caused by vibration. A threaded hole on the supporting block I-0711 is also a through hole, the horizontal plate I-0709 has a countersunk hole, and a threaded hole on the ball cyclic returning device I-0710 is a blind hole. The hexagon socket head cap screw I-0706 is connected to the horizontal plate I-0709, the supporting block I-0711 and the ball cyclic returning device I-0710 in turn. The standard spring washer I-0708 is added between the hexagon socket head cap screw I-0706 and the horizontal plate I-0709 to prevent the hexagon socket head cap screw I-0706 from loosening.

Figure 7A:
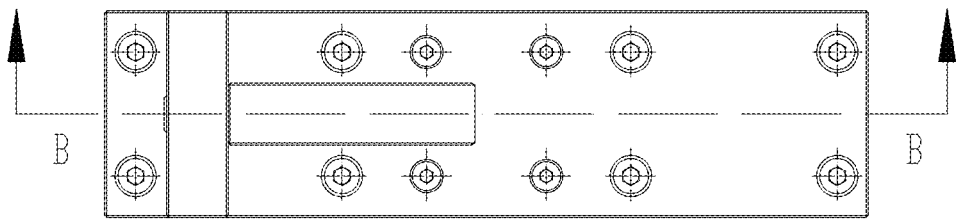
FIG. 7(a) is a top view of a connecting assembly.
Figure 7B:
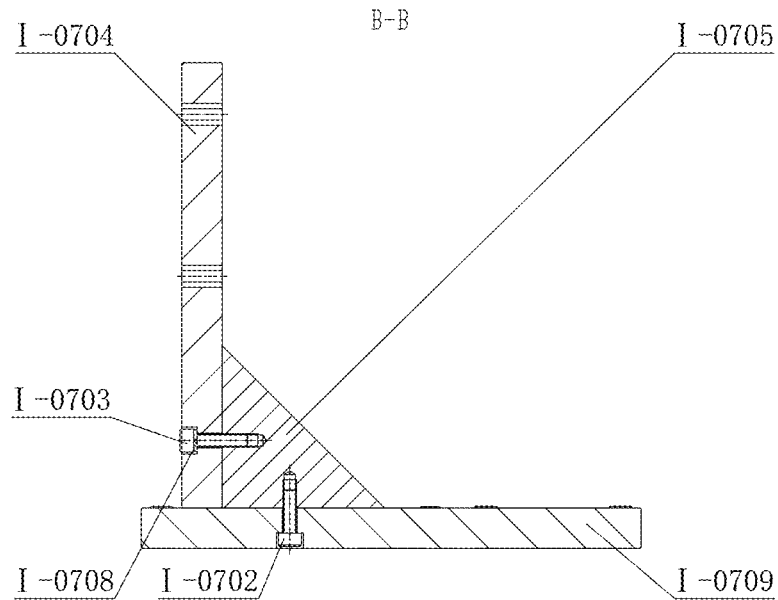
FIG. 7(b) is a B-B sectional view of FIG. 7(a)
Figure 12:
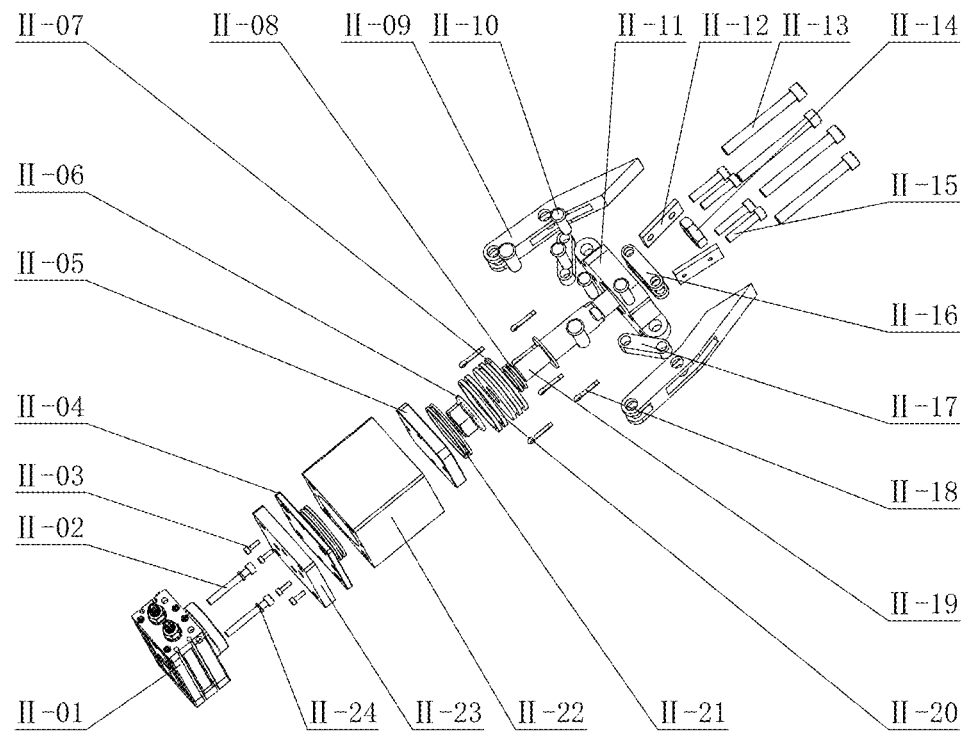
FIG. 12 is an exploded view of the workpiece automatic flip device.
Figure 13:
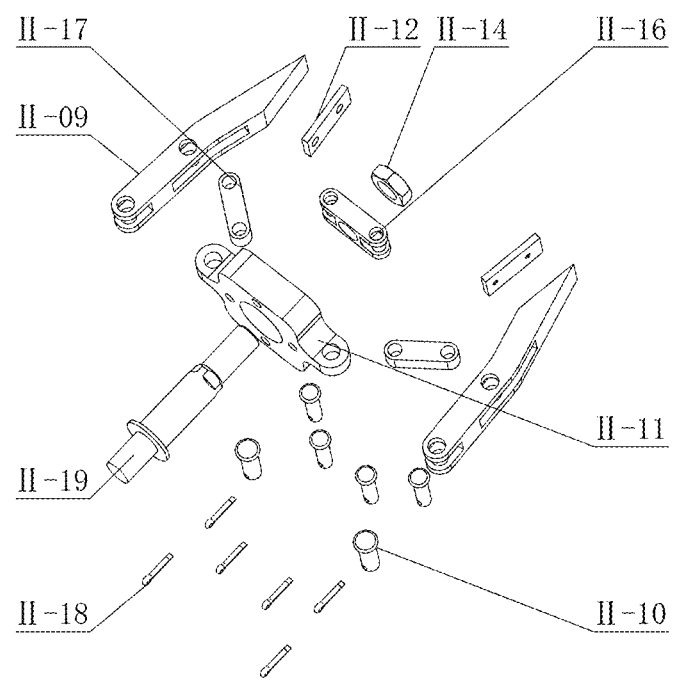
FIG. 13 is an exploded view of a workpiece flip clamping assembly.

As shown in FIG. 7(*a*) and FIG. 7(*b*), the vertical plate I-0704 and the standard spring washer I-0708 are provided with a countersunk hole, the stiffening plate I-0705 is provided with a threaded hole placed at 90 degrees, and the threaded hole is a blind hole. The vertical plate I-0704 and the stiffening plate I-0705 are connected through the hexagon socket head cap screw I-0703. The stiffening plate I-0705 and the horizontal plate I-0709 are connected through the hexagon socket head cap screw I-0702.

As shown in FIG. 8(*a*) and FIG. 8(*b*), the ball screw I-06 is an actuator for converting a rotary motion into a linear motion or converting a linear motion into a rotary motion, and has the advantages of high transmission efficiency, accurate positioning and low friction force. A left end of the ball screw I-06 is provided with a keyway, through which the ball screw I-06 is connected to the coupler I-08 through a flat key for transmitting torque. The ball screw I-06 has a high precision, and attention needs to be paid to protecting the ball screw I-06 during use.

As shown in FIG. 9(*a*) and FIG. 9(*b*), the linear guide rail cylinder I-0201 above the linear guide rail I-02 has a cylindrical structure, and the countersunk hole I-0202 of the linear guide rail is provided below, wherein the linear bearing pedestal I-0701 is nested on the linear guide rail cylinder I-0201, which can ensure that the linear bearing pedestal I-0701 can slide freely on the linear guide rail I-02. The linear guide rail I-02 has a high precision. In order to maintain the precision of the linear guide rail I-02, attention needs to be paid to prevent rust and avoid strong stamping when in use.

As shown in FIG. 10, FIG. 10(*a*), and FIG. 10(*b*), the linear bearing pedestal I-0701 is a linear motion system produced at a low cost, which is used for infinite travel in conjunction with a cylinder axis. Because a bearing ball is in point contact with the axis, a service load is small. A steel ball rotates with very little friction resistance, so that high-precision and stable motion can be implemented. Four threaded through holes are uniformly distributed at four corners of the linear bearing pedestal I-0701, and are connected to the horizontal plate I-0709 through threads.

This embodiment discloses the workpiece automatic flip device, wherein the workpiece automatic flip device II is pneumatically controlled to rotate, so as to realize position and posture changes of the workpiece from one procedure to next procedure. The rotary cylinder II-01 is provided with two countersunk holes. A hexagon socket head cap screw II-02 connects the rotary cylinder II-01 with the vertical plate I-0704 through the two countersunk holes. A standard spring washer II-24 is added between a hexagon socket countersunk head screw and the countersunk hole to prevent the screw from loosening caused by vibration. A rotary connecting plate II-23 is a part connecting the rotary cylinder II-01 and a bottom plate II-04 of the thin-type hydraulic cylinder, and the rotary connecting plate II-23 is provided with four countersunk holes and four threaded holes. The bottom plate II-04 of the thin-type hydraulic cylinder and a cylinder body II-22 corresponding to the countersunk holes on the rotary connecting plate II-23 are provided with four threaded holes, wherein the threaded holes on the bottom plate II-04 of the thin-type hydraulic cylinder are through holes, while the threaded holes on the cylinder body II-22 are blind holes, and the holes are connected by a hexagon socket head cap screw II-13 in sequence according to a sequence of the rotary connecting plate II-23, the bottom plate II-04 of the thin-type hydraulic cylinder and the cylinder body II-22. The rotary cylinder drives the thin-type hydraulic cylinder and a mechanical claw opening-and-closing finger to turn over through pneumatic action. The rotary cylinder II-01 is also provided with threaded holes at positions corresponding to the threaded holes on the rotary connecting plate II-23, and the bottom plate II-04 of the thin-type hydraulic cylinder is connected to the rotary connecting plate II-23 by a hexagon socket head cap screw II-03. Two sealing grooves are arranged on a boss of the thin-type hydraulic cylinder bottom plate II-04, and a sealing ring II-21 at a bottom portion of the cylinder is nested on the two sealing grooves of the bottom plate II-04 of the thin-type hydraulic cylinder to seal the bottom portion of the thin-type hydraulic cylinder. An inner wall of the cylinder body II-22 is smooth, and threaded holes are opened on an inner wall of the cylinder body II-22 and used as an oil inlet and an oil outlet, which are convenient for installing sealing parts. An opening is arranged above the cylinder body II-22, to enable a piston rod II-19 to move up and down. At the same time, there are two sealing grooves at the opening, and a cylinder body sealing ring II-08 is nested in the two sealing grooves respectively. A piston II-07 is provided with two sealing grooves, and a sealing ring II-20 of the piston rod is nested in the two sealing grooves to separate an oil inlet cavity from an oil return cavity. A transmission medium such as hydraulic oil pushes the piston II-07 to drive the piston rod II-19 to move under pressure. The piston II-07 is sleeved on the piston rod II-19, one end of the piston II-07 is positioned by a shoulder on the piston rod II-19, and the other end of the piston II-07 is positioned by a locking nut II-06. A bottom portion of the piston rod II-19 is lathed with a thread, and the locking nut II-06 is connected to the piston rod II-19 through the thread, thus securing the piston II-07 on the piston rod II-19. The mechanical claw opening-and-closing finger II-09 and a hinge securing plate II-11 are connected by a pin shaft II-10. The pin shaft II-10 passes through a front pin hole II-0901 on the mechanical claw opening-and-closing finger II-09 and a pin hole II-1103 on the hinge securing plate II-11 in turn to form a hinge mechanism, and a cotter pin II-18 passes through a pin hole at an end portion of the pin shaft II-10 for securing. The mechanical claw opening-and-closing finger II-09, a hinge buckle II-17 and a hollow hinge buckle II-16 are connected by the pin shaft II-10. The pin shaft II-10 passes through a rear pin hole II-0902 on the mechanical claw opening-and-closing finger II-09, an upper pin hole II-1701 on the hinge buckle II-17 and the pin hole II-1103 on the hinge securing plate II-11 in turn to form a hinge mechanism, and the cotter pin II-18 passes through the pin hole at the end portion of the pin shaft II-10 for securing. The piston rod II-19 passes through an axle hole II-1101 on the hinge securing plate II-11. One end of the piston rod II-19 is threaded, and is in threaded connection with the hollow hinge buckle II-16 through a threaded hole II-1602, and then the hollow hinge buckle II-16 is secured on the piston rod II-19 through a hexagonal nut II-14. The piston rod II-19, the mechanical claw opening-and-closing finger II-09, the hinge buckle II-17 and the hollow hinge buckle II-16 form a four-rod mechanism. An axial movement of the piston rod II-19 can realize the swing of the mechanical claw opening-and-closing finger II-09, so that an end portion of the mechanical claw opening-and-closing finger II-09 can realize opening and closing functions. A cushion II-12 is made of rubber and other materials with certain elastic deformation, and is secured at the end portion of the mechanical claw opening-and-closing finger II-09 by a hexagon socket head cap screw to prevent the workpiece from being pinched during flip. A specific implementation manner is that oil is fed into the thin-type hydraulic cylinder feeds oil. Due to a sealing action of the bottom plate II-04 of the thin-type hydraulic cylinder, the sealing ring II-21 at the bottom of the cylinder, the piston II-07 and the sealing ring II-20 of the piston rod, a certain oil pressure is formed in the oil inlet cavity, thus pushing the piston II-07 to move. Because the shoulder II-19 on the piston rod limits a position of the piston II-07, the piston II-07 drives the piston rod II-19 to move axially. The hollow hinge buckle II-16 is connected by the hexagonal nut II-14 and the piston rod II-19, and is secured therebetween. The movement of the hollow hinge buckle II-16 drives a position and a posture of the hinge buckle II-17 to change. Because the front pin hole II-0901 on the mechanical claw opening-and-closing finger II-09 is hinged with the pin hole II-1103 on the hinge securing plate II-11, and meanwhile, the hinge securing plate II-11 is secured on a connecting plate II-05 of the mechanical claw and the cylinder body II-22 through a hexagon socket head cap screw II-15, so the movement of the hinge buckle II-17 drives the mechanical claw opening-and-closing finger II-09 to rotate relative to an axis where the front pin hole II-0901 locates, and the two mechanical claw opening-and-closing fingers II-09 rotate at the same time so as to close the mechanical claw to clamp the workpiece. After the mechanical claw clamps the workpiece, the rotary cylinder II-01 acts, which drives the thin-type hydraulic cylinder and the mechanical claw clamping the workpiece to turn over simultaneously when turning over, so as to facilitate machining in next procedure.

Figures 14A, 14B, 14C:
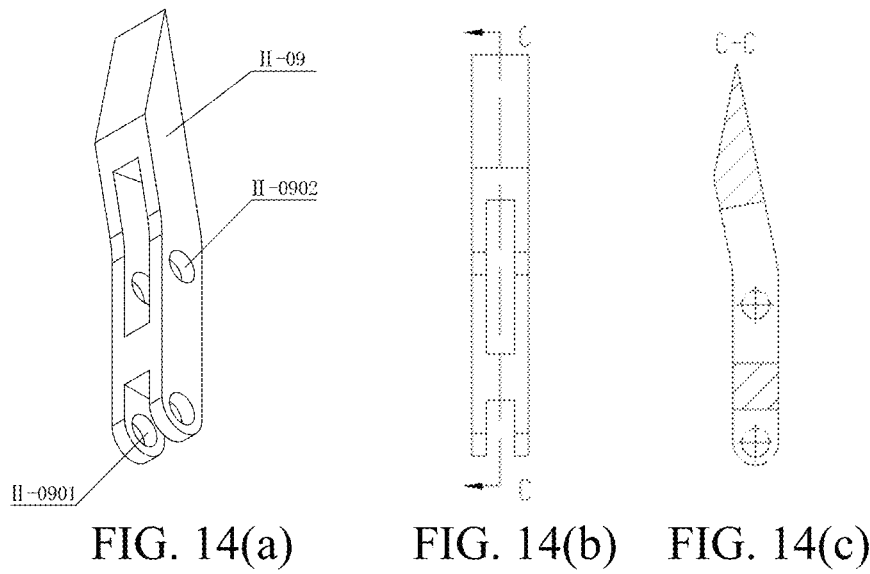
FIG. 14(a) is an axonometric drawing of a mechanical claw opening-and-closing finger.
FIG. 14(b) is a side view of the mechanical claw opening-and-closing finger.
FIG. 14(c) is a C-C sectional view of FIG. 14(b)

As shown in FIG. 14(*a*), FIG. 14(*b*) and FIG. 14(*c*), the mechanical claw opening-and-closing finger II-09 is a rod that deflects at a certain angle. The mechanical claw opening-and-closing finger II-09 is provided with two front pin holes II-0901 and two rear pin holes II-0902, which are connected to the pin hole II-1103 and the upper pin hole II-1701 through the pin shaft II-10 respectively, so that the mechanical claw opening-and-closing finger II-09 is respectively secured to the hinge buckle II-17 and the hinge securing plate II-11. Meanwhile, in order to reduce a weight of the whole fixture system, the mechanical claw opening-and-closing finger II-09 is made into a hollow shape on the premise of ensuring the strength.

Figure 15A:
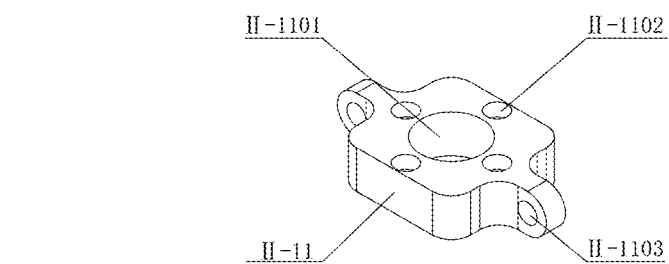
FIG. 15(a) is an axonometric drawing of a hinge securing plate.
Figures 15B, 15C:
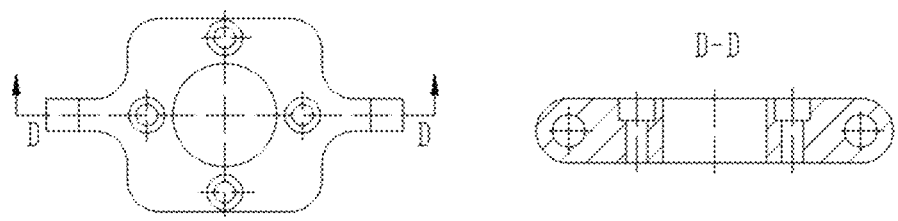
FIG. 15(b) is a top view of the hinge securing plate.
FIG. 15(c) is a D-D sectional view of FIG. 15(b)

As shown in FIG. 15(*a*), FIG. 15(*b*) and FIG. 15(*c*), the hinge securing plate II-11 is provided with two bosses, the boss is provided with the pin hole II-1103, and the pin hole II-1103 is hinged with the front pin hole II-0901 on the mechanical claw opening-and-closing finger II-09 through the pin shaft II-10. The hinge securing plate II-11 is provided with four countersunk holes II-1102 which are uniformly arranged. The countersunk holes II-1102 are connected to the connecting plate II-05 of the mechanical claw through the hexagon socket head cap screw II-15. In addition, the hinge securing plate II-11 is provided with the axle hole II-1101 for the piston rod II-19 to pass through, and a diameter of the axle hole II-1101 is greater than that of the piston rod II-19.

Figure 16A:
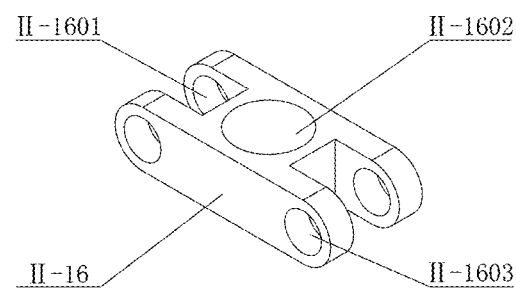
FIG. 16(a) is an axonometric drawing of a hollow hinge buckle.

As shown in FIG. 16(*a*), FIG. 16(*b*) and FIG. 16(*c*), the hollow hinge buckle II-16 is provided with a left pin hole II-1601 and a right pin hole II-1603. The left pin hole II-1601 and the right pin hole II-1603 are respectively hinged through the pin shaft II-10 and a lower pin hole II-1702 of the hinge buckle II-17. The threaded hole II-1602 is arranged in a middle of the hinge securing plate II-11, and the hollow hinge buckle II-16 is in thread connection with the piston rod II-19 through the threaded hole II-1602, so that the hollow hinge buckle II-16 is secured.

As shown in FIG. 17(*a*), FIG. 17(*b*) and FIG. 17(*c*), upper and lower ends of the hinge buckle II-17 are provided with the upper pin hole II-1701 and the lower pin hole II-1702, which are respectively hinged with the right pin hole II-1603 and the rear pin hole II-0902 through the pin shaft II-10.

Figure 19:
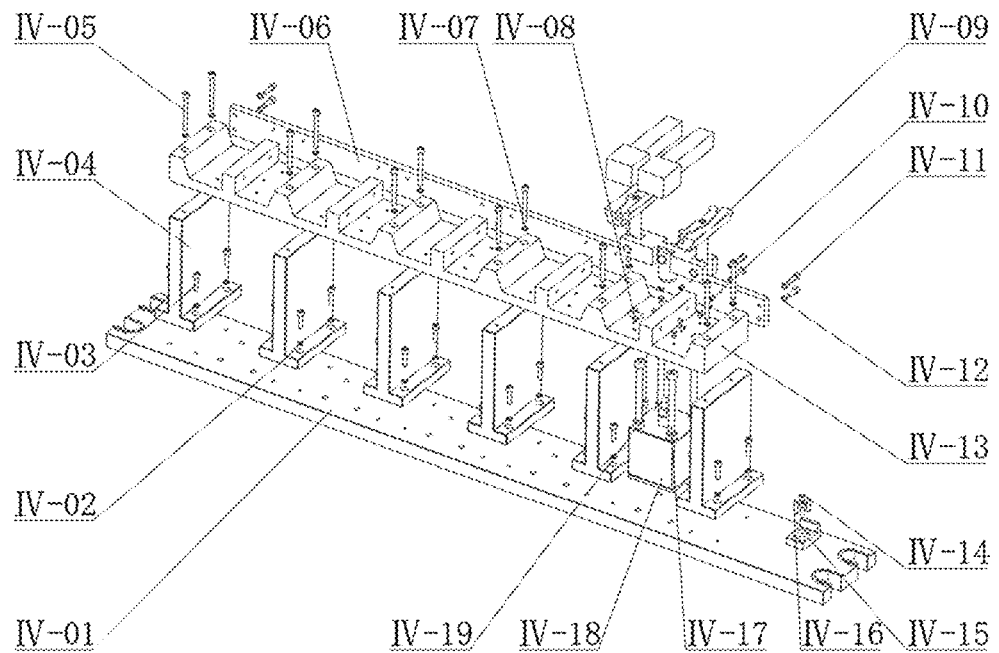
FIG. 19 is an exploded view of the self-positioning floating clamping device according to the first embodiment.

This embodiment discloses the self-positioning floating clamping device, as shown in FIG. 18 and FIG. 19. Left and right ends of a fixture bottom plate IV-01 are provided with two symmetrical grooves, and the grooves are additionally provided with bosses of 2 to 3 mm which are finished. The fixture bottom plate IV-01 is secured on the workbench of the milling machine by a T-shaped bolt T-shaped screw. The T-shaped screw connects the workbench of the milling machine with the fixture bottom plate IV-01 by a hexagonal nut, and the nut is placed on an upper surface of the finished boss of the groove. Bosses at left and right sides of a supporting plate IV-04 are respectively provided with two countersunk holes IV-0401 of the supporting plate IV-04, and threaded holes are arranged on positions of the fixture bottom plate IV-01 corresponding to the countersunk holes. The supporting plate IV-04 and the fixture bottom plate IV-01 are connected by a hexagon socket head cap screw IV-03, and a standard spring washer IV-02 is added between the hexagon socket head cap screw IV-03 and the supporting plate IV-04 to prevent the hexagon socket head cap screw IV-03 from loosening and causing the whole fixture system unstable. A fixture main plate IV-13 is provided with a plurality of stations, and three connecting holes IV-1303 are arranged below each station of the fixture main plate IV-13 for placing A-type support nails IV-08 to position a lower surface of the workpiece. A side face of each station is provided with two connecting holes IV-1302 for placing C-type support nails IV-10 to provide side positioning of the workpiece. The A-type support nails and the C-type support nails provide six-point positioning of the workpiece. A pair of threaded holes IV-1304 are arranged at regular intervals on the fixture main plate IV-13, and a threaded hole is arranged above the supporting plate IV-04. A hexagon socket head cap screw IV-05 passes through the threaded holes IV-1304 to connect the fixture main plate IV-13 with the supporting plate IV-04 through threads. A standard spring washer IV-07 is added between the hexagon socket head cap screw IV-05 and the fixture main plate IV-13 to prevent the hexagon socket head cap screw IV-05 from loosening caused by vibration. A countersunk hole is arranged on a rear plate IV-06, and a threaded hole is arranged behind the fixture main plate IV-13. The rear plate IV-06 is connected to the fixture main plate IV-13 through a hexagon socket head cap screw IV-11. A standard spring washer IV-12 is added between the rear plate IV-06 and the hexagon socket head cap screw IV-11 to prevent the standard spring washer IV-12 from loosening. Hidden pin holes are arranged on the rear plate IV-06 for placing the C-type support nails IV-10, and providing bottom surface supporting for the workpiece. Every two stations have one floating clamping assembly IV-09 as an actuator, and the floating clamping assembly IV-09 is in thread connection with a thin-type hydraulic cylinder IV-18. A feeler block IV-15 is provided with a countersunk hole and a pin hole, and the corresponding fixture bottom plate IV-01 is provided with a threaded hole and a pin hole. The feeler block IV-15 is positioned by a positioning pin IV-16 and connected to the fixture bottom plate IV-01 by a hexagon socket head cap screw IV-14 through a thread. The thin-type hydraulic cylinder IV-18 is secured to the fixture bottom plate IV-01 through a hexagon socket head cap screw IV-17, and a standard spring washer IV-19 is arranged on the hexagon socket head cap screw IV-17. The self-positioning floating clamping device IV is powered by the thin-type hydraulic cylinder IV-18. When oil is fed to an oil inlet cavity of the thin-type hydraulic cylinder IV-18, a piston rod of the thin-type hydraulic cylinder IV-18 moves downwards, thus pulling the whole floating clamping assembly IV-09 to move downwards.

Figure 20A:
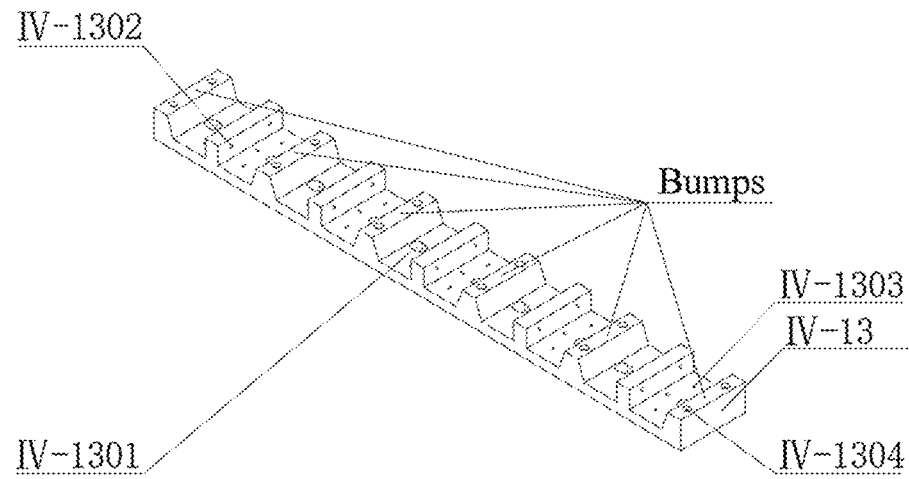
FIG. 20(a) is an axonometric drawing of a fixture main plate according to the first embodiment.
Figure 20B:
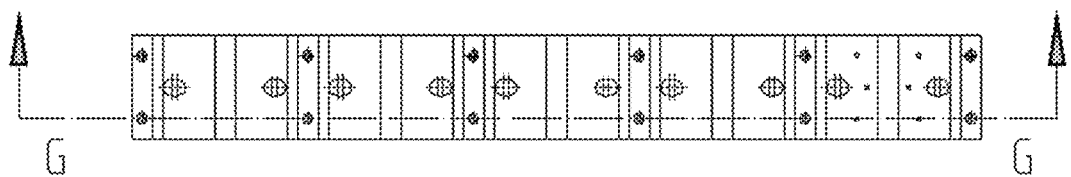
FIG. 20(b) is a top view of the fixture main plate according to the first embodiment.
Figures 20C, 20D:
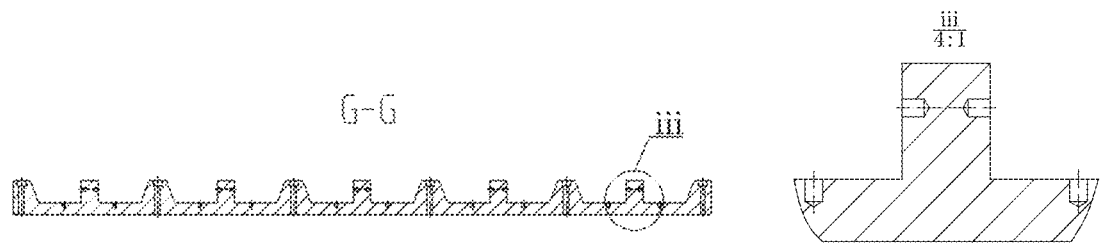
FIG. 20(c) is a G-G sectional view of FIG. 20(b)
FIG. 20(d) is a partial enlarged view of a part iii in FIG. 20(c)

As shown in FIG. 20(*a*), FIG. 20(*b*) and FIG. 20(*c*), a through hole IV-1301 is arranged at each station on the fixture main plate IV-13. A connecting rod IV-0902 passes through the through hole IV-1301, and can swing within a certain range to balance a clamping force between the two stations. A plane where the connecting hole IV-1302 and the connecting hole IV-1303 locate is 90 degrees, and the C-type support nails IV-10 and the A-type support nail IV-08 are respectively installed to provide the positioning of the lower surface and side face of the workpiece. The fixture main plate IV-13 is provided with an inclined wedge surface at each station, which is contacted with an inclined wedge surface of a floating clamping base IV-0906.

Figure 21:
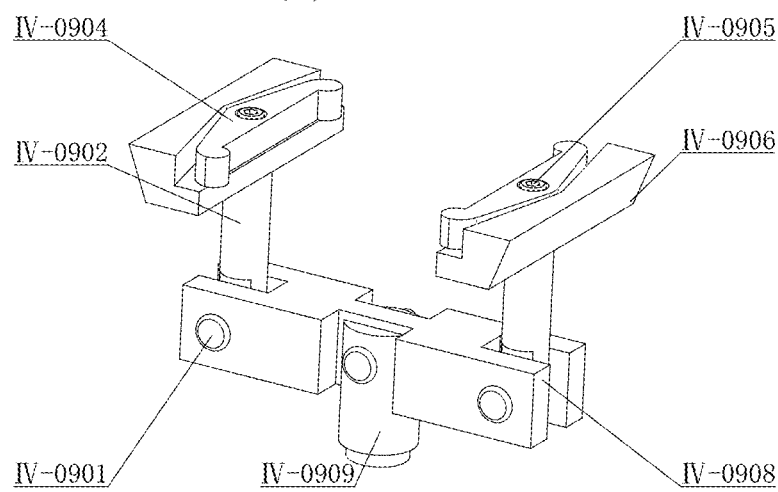
FIG. 21 is an axonometric drawing of a self-positioning floating clamping assembly according to the first embodiment.
Figure 22:
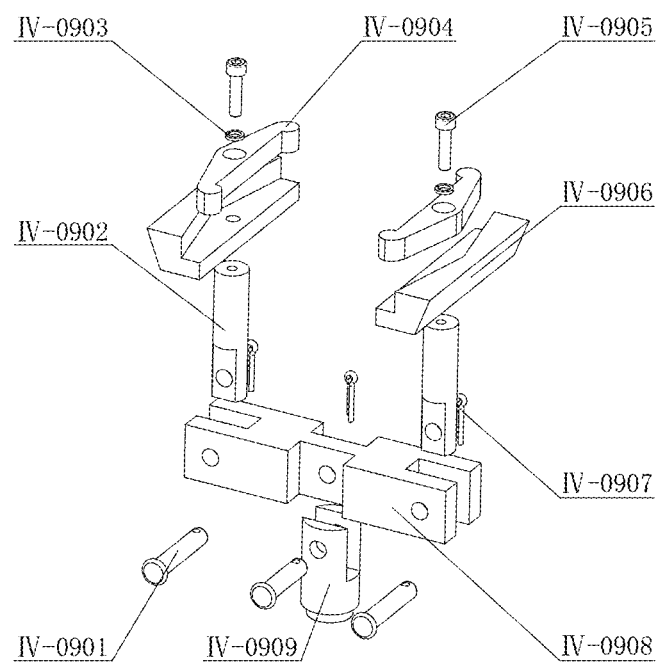
FIG. 22 is an exploded view of the self-positioning floating clamping assembly according to the first embodiment.
Figure 23A:
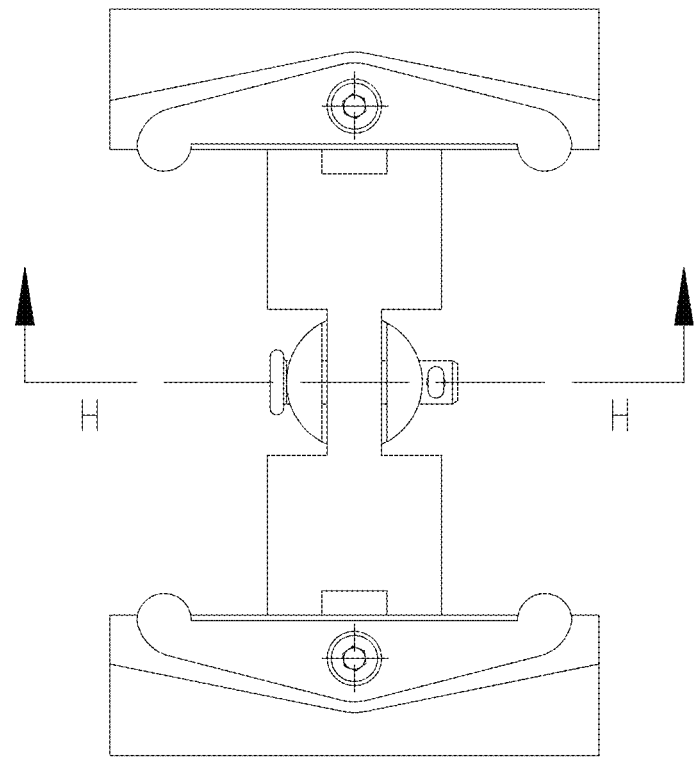
FIG. 23(a) is a top view of the self-positioning floating clamping assembly according to the first embodiment.
Figure 23B:
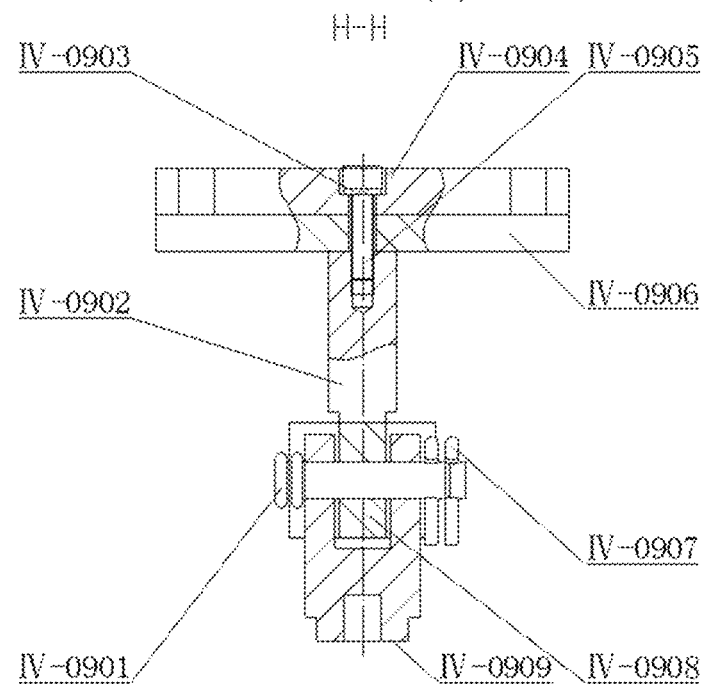
FIG. 23(b) is an H-H sectional view of FIG. 23(a)
Figure 23C:
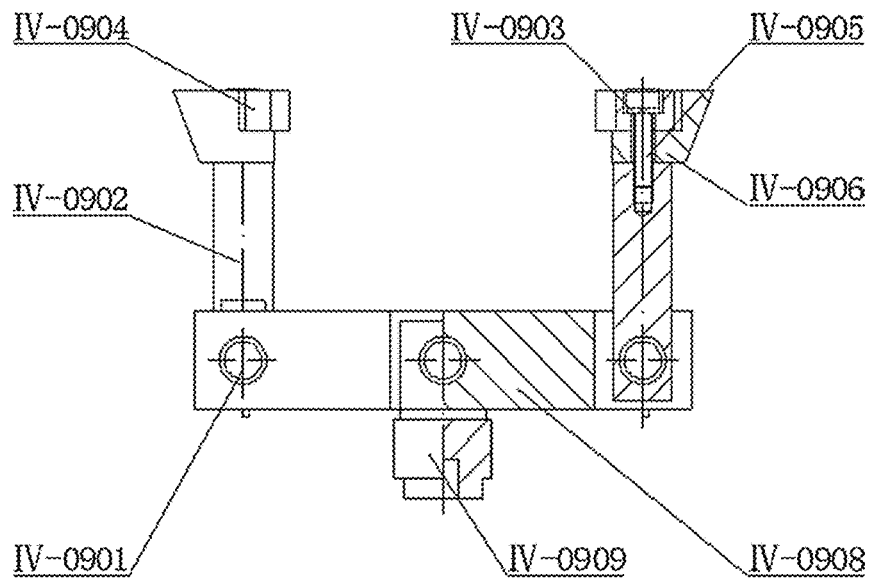
FIG. 23(c) is a semi-sectional view of the self-positioning floating clamping assembly according to the first embodiment.

As shown in FIG. 21, FIG. 22, FIG. 23(*a*), FIG. 23(*b*), and FIG. 23(*c*), pin holes are arranged at two ends and a middle of a connecting plate IV-0908 of the floating clamping assembly IV-09. A cylindrical surface is machined into a plane and a pin hole is arranged below the connecting rod IV-0902. A pin shaft IV-0901 pass through the pin holes of the connecting plate IV-0908 and the connecting rod IV-0902 in turn to form hinge connection. A cotter pin IV-0907 is inserted into a hole at a bottom portion of the pin shaft IV-0901 to limit axial movement of the pin shaft IV-0901. A groove and a pin hole are machined at one end of a pull rod IV-0909, and the pull rod IV-0909 is connected to the connecting plate IV-0908 through the pin shaft IV-0901. The pin shaft IV-0901 passes through a pin hole at an end portion of the pull rod IV-0909 and a pin hole in a middle of the connecting plate IV-0908 in turn to form hinge connection, and is secured by the cotter pin IV-0907. A threaded hole is arranged above the connecting rod IV-0902, and a floating clamping base IV-0906 is provided with a through hole, and a floating clamping block IV-0904 is provided with a countersunk hole, and the three holes are connected by a hexagon socket head cap screw IV-0905. It should be pointed out that it is necessary to ensure that the hexagon socket head cap screw IV-0905 can rotate relative to the floating clamping base IV-0906 after connection, so as to realize the self-positioning clamping function. A standard spring washer IV-0903 is arranged on the hexagon socket head cap screw IV-0905. The floating clamping assembly IV-09 after connection is in a state that a relative rotation center between each part and an adjacent connected part can rotate within a certain range. When the thin-type hydraulic cylinder IV-18 provides a downward pulling force, the pull rod IV-0909 is pulled to move downward. Because the pull rod IV-0909 is hinged with the connecting plate IV-0908, the connecting plate IV-0908 is driven to move downward. Two ends of the connecting plate IV-0908 are hinged with two connecting rods IV-0902 at the same time, thus pulling the connecting rod IV-0902 to move downward. During the downward movement of the connecting rod IV-0902, because the floating clamping block IV-0904, the floating clamping base IV-0906 and the connecting rod IV-0902 are connected by the hexagon socket head cap screw IV-0905, when the floating clamping base IV-0906 moves downward, an inclined wedge mechanism is formed by the contact between an inclined wedge surface on the side face of the floating clamping base IV-0906 and an inclined wedge surface on the fixture main plate IV-13; when the connecting rod IV-0902 applies a downward force to the floating clamping base IV-0906, due to the existence of the inclined wedge mechanism, the inclined wedge surface generates a reaction force to the floating clamping base IV-0906, and the floating clamping base contacts with the fixture main plate through the inclined wedge surface to generate a reaction force, which is then transmitted to the floating clamping block, thus providing the clamping force of the workpiece.

Figure 24:
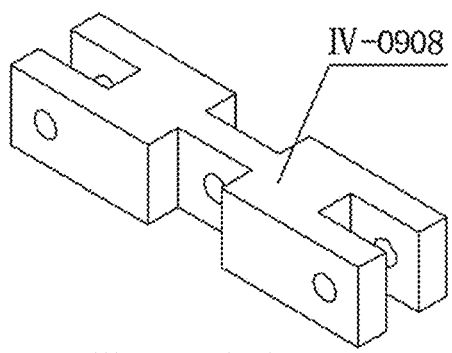
FIG. 24 is an axonometric drawing of a connecting plate according to the first embodiment.
Figure 24A:
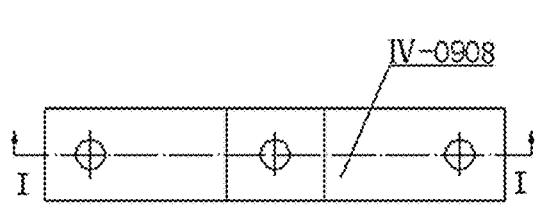
FIG. 24(a) is a top view of the connecting plate according to the first embodiment.
Figure 24B:
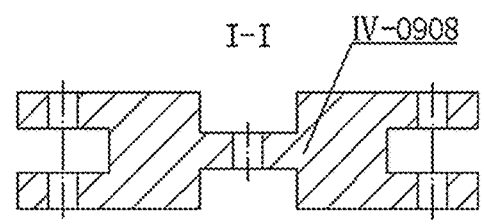
FIG. 24(b) is an I-I sectional view of FIG. 24(a)

As shown in FIG. 24, FIG. 24(*a*) and FIG. 24(*b*), middle and two ends of the connecting plate IV-0908 are each provided with a pin hole. The middle and two ends are also provided with a groove. The two ends are respectively hinged with the connecting rod IV-0902 through the pin shaft IV-0901. Similarly, the middle is hinged with the pull rod IV-0909 through the pin shaft IV-0901.

Figure 25:
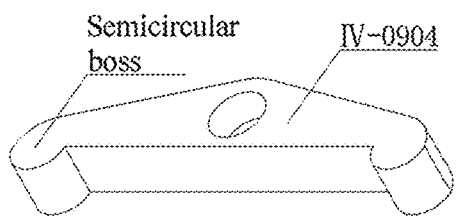
FIG. 25 is an axonometric drawing of a floating clamping block according to the first embodiment.
Figures 25A, 25B:
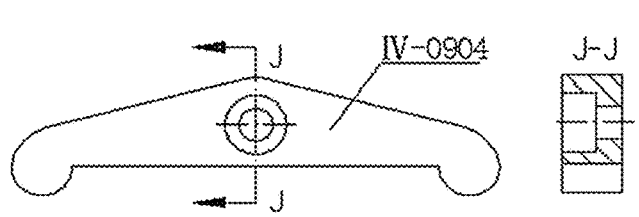
FIG. 25(a) is a top view of the floating clamping block according to the first embodiment.
FIG. 25(b) is a J-J sectional view of FIG. 25(a)

As shown in FIG. 25, FIG. 25(*a*) and FIG. 25(*b*), the floating clamping block IV-0904 claims the workpiece through two semicircular bosses. A middle of the floating clamping block IV-0904 is provided with a countersunk hole, which is connected to the floating clamping base IV-0906 and the connecting rod IV-0902 through the hexagon socket head cap screw IV-0905. An acting force of the inclined wedge surface against the floating clamping base IV-0906 is transferred to the floating clamping block IV-0904 through the hexagon socket head cap screw IV-0905 to clamp the workpiece.

Figure 26:
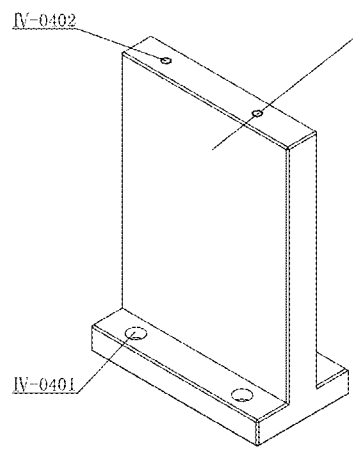
FIG. 26 is an axonometric drawing of a supporting plate according to the first embodiment.
Figure 26A:
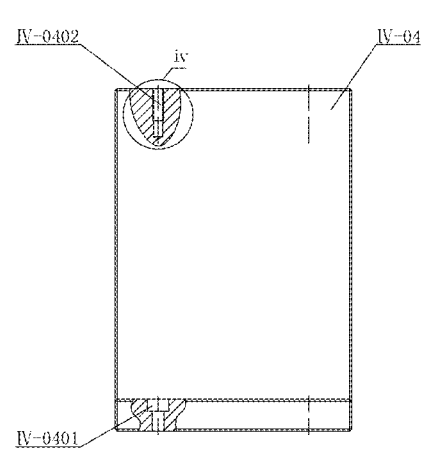
FIG. 26(a) is a partial sectional view of the supporting plate according to the first embodiment.
Figure 26B:
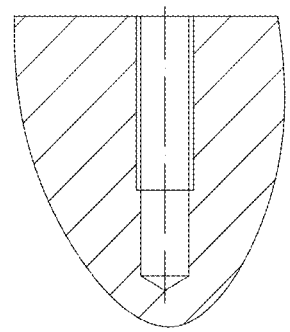
FIG. 26(b) is a partial enlarged view of a part iv in FIG. 26(a)

As shown in FIG. 26, FIG. 26(*a*) and FIG. 26(*b*), a bottom portion of the supporting plate IV-04 is respectively provided with two symmetrical countersunk holes on the left and right, which are connected onto the fixture bottom plate IV-01 through the hexagon socket head cap screw IV-03. Two threaded holes IV-0402 are arranged above the supporting plate IV-04, and are connected onto the fixture main plate IV-13 through the hexagon socket head cap screw IV-05.

Figure 27A:
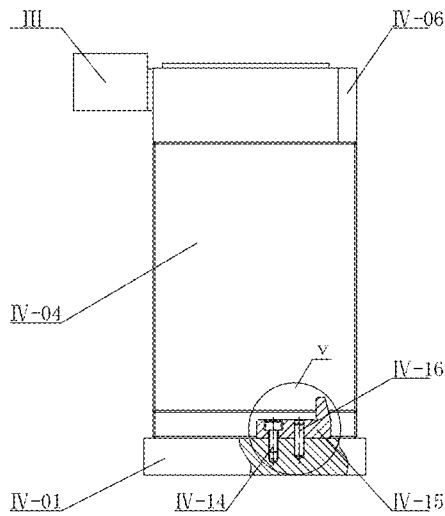
FIG. 27(a) is a right view of the self-positioning floating clamping device according to the first embodiment.
Figure 27B:
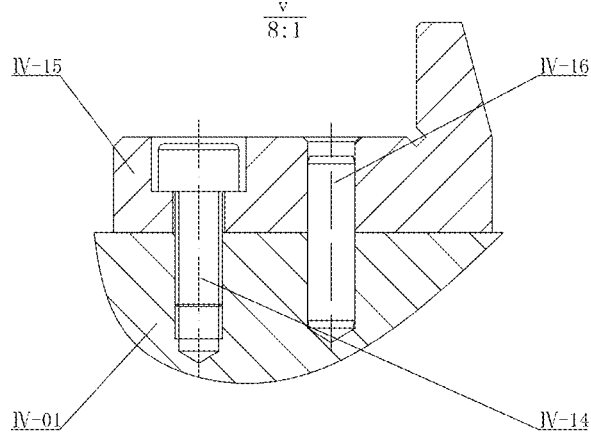
FIG. 27(b) is a partial enlarged view of a part V in FIG. 27(a)

As shown in FIG. 27 (*a*) and FIG. 27 (*b*), the self-positioning floating clamping device IV is provided with the counter block IV-15, which is positioned by the positioning pin IV-16 and secured to the fixture bottom plate IV-01 by the hexagon socket head cap screw IV-14. Tool setting methods for fixtures usually include a workpiece trial cutting method and a method of using a tool setting device for tool setting. The method of using the tool setting device for tool setting does not need to cut the workpiece again every time the fixture is installed and used, so this method is more convenient. The tool setting device adopted in the present disclosure is the feeler block IV-15, and the feeler block IV-15 enables a tool to be in a correct position relative to a fixture positioning element.

Embodiment 2

Figure 28:
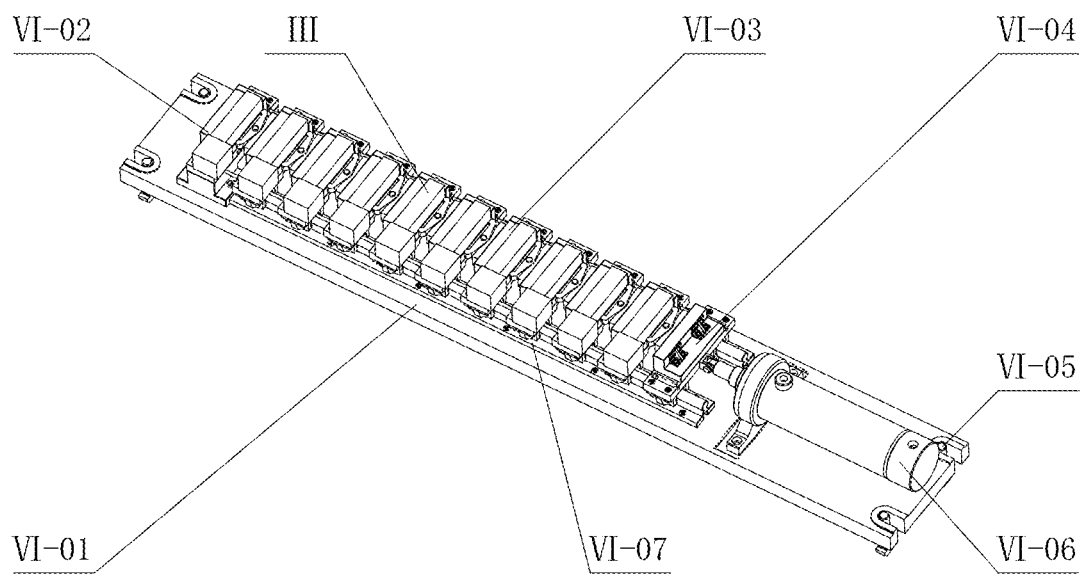
FIG. 28 is an axonometric drawing of a self-positioning floating clamping device according to a second embodiment.

This embodiment discloses a second self-positioning clamping method, which can achieve the same functions as that of the self-positioning floating clamping device IV. As shown in FIG. 28, a bottom plate VI-01 is fixedly connected to a workbench of a milling machine through four T-shaped bolts VI-05 and hexagonal nuts. A left end of the self-positioning floating clamping device is provided with a positioning supporting assembly VI-02. The positioning supporting assembly VI-02 is secured on the bottom plate VI-01 through a hexagon socket head cap screw. Two linear guide rails VI-07 are secured on the bottom plate VI-01 through hexagon socket head cap screws. Both a positioning and floating clamping assembly VI-03 and a floating pressing assembly VI-04 can slide left and right on the linear guide rails VI-07, and a hydraulic cylinder VI-06 hydraulically pushes the floating pressing assembly VI-04 to move left to press the workpiece III. The workpiece III transmits the thrust to the positioning and floating clamping assembly VI-03. The positioning and floating clamping assembly VI-03 transmits the thrust to the following positioning and floating clamp assembly VI-03, and so on, until the last positioning and floating clamping assembly VI-03 applies the thrust on the positioning supporting assembly VI-02. Since the positioning supporting assembly VI-02 is secured on the bottom plate VI-01, the floating pressing assembly VI-04, the positioning and floating clamping assembly VI-03 and the positioning supporting assembly VI-02 are pressed against each other, the workpiece III therein is also pressed.

Figure 29:
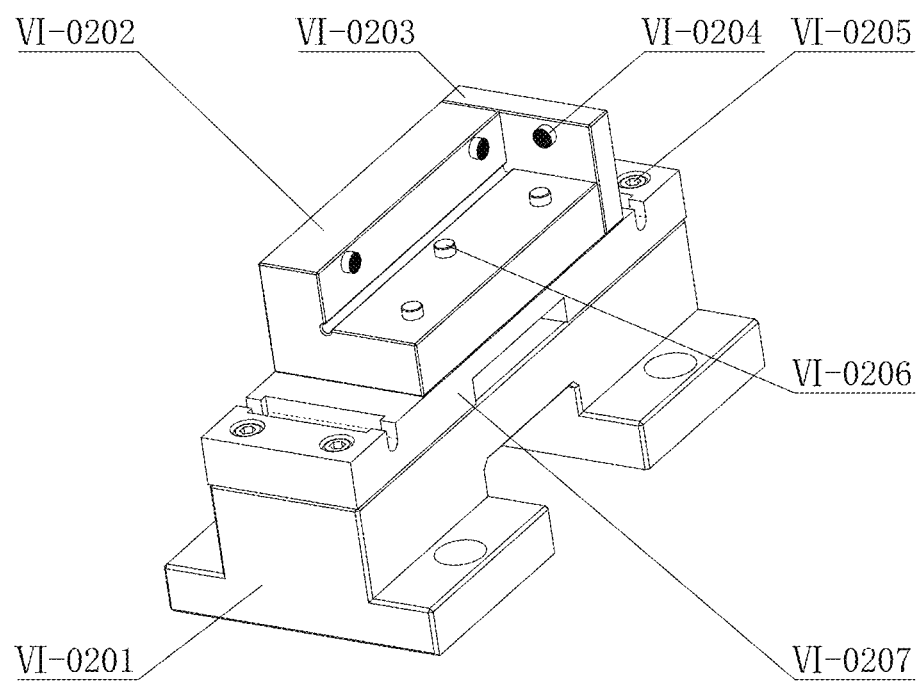
FIG. 29 is an axonometric drawing of a positioning supporting assembly according to the second embodiment.

As shown in FIG. 29, a connecting block VI-0201 is secured on the bottom plate VI-01 by a hexagon socket head cap screw, and a cover plate VI-0207 is connected onto the connecting block VI-0201 by a hexagon socket head cap screw VI-0205. A positioning plate VI-0202, a C-type support nail VI-0204, and the cover plate VI-0207 are all connected by hexagon socket head cap screws. The positioning plate VI-0202 and a baffle VI-0203 are both equipped with an A-type support nail VI-0206 and the C-type support nail VI-0204 for positioning the workpiece III.

Figure 30A:
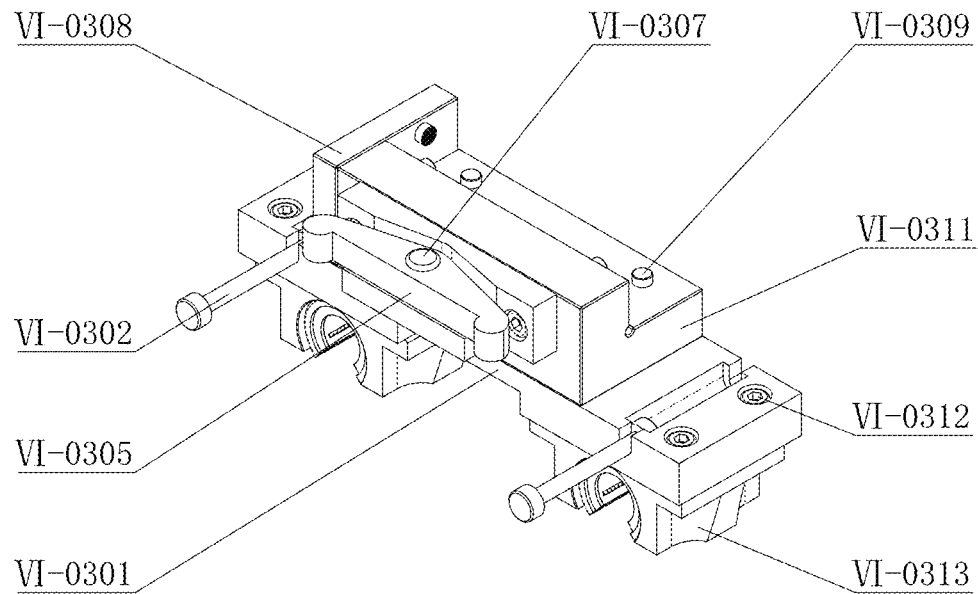
FIG. 30(a) is an axonometric drawing of a positioning and floating clamping assembly according to the second embodiment.
Figure 30B:
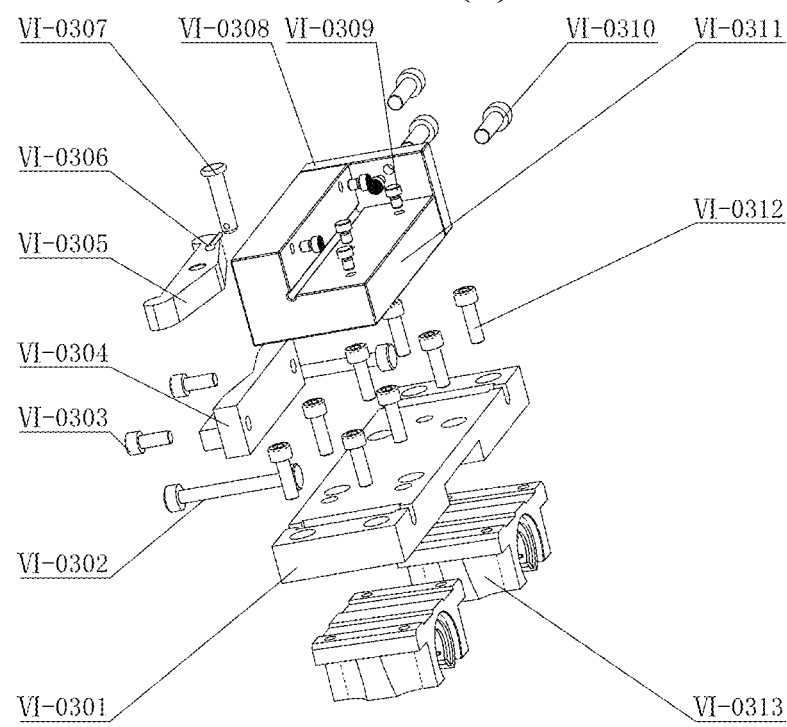
FIG. 30(b) is an exploded view of the positioning and floating clamping assembly according to the second embodiment.

As shown in FIG. 30(a) and FIG. 30(b), a cover plate VI-0301 is connected onto a linear bearing pedestal VI-0313 through a hexagon socket head cap screw VI-0312, and the linear bearing pedestal VI-0313 can slide on the bottom plate VI-01. The cover plate VI-0301 is provided with two grooves for a cylindrical pull rod VI-0302 to slide in to limit a sliding distance. A floating clamping base VI-0304 is connected onto a positioning plate VI-0311 through a hexagon socket head cap screw VI-0303, and a floating clamping block VI-0305 is connected onto the floating clamping base VI-0304 through a pin shaft VI-0307, so a cotter VI-0306 can rotate freely, and a baffle VI-0308 is connected to the positioning plate VI-0311 through a hexagon socket head cap screw VI-0310. Support nails VI-0309 is installed on the baffle VI-0308 and the positioning plate VI-0311 to position the workpiece III.

Figure 31:
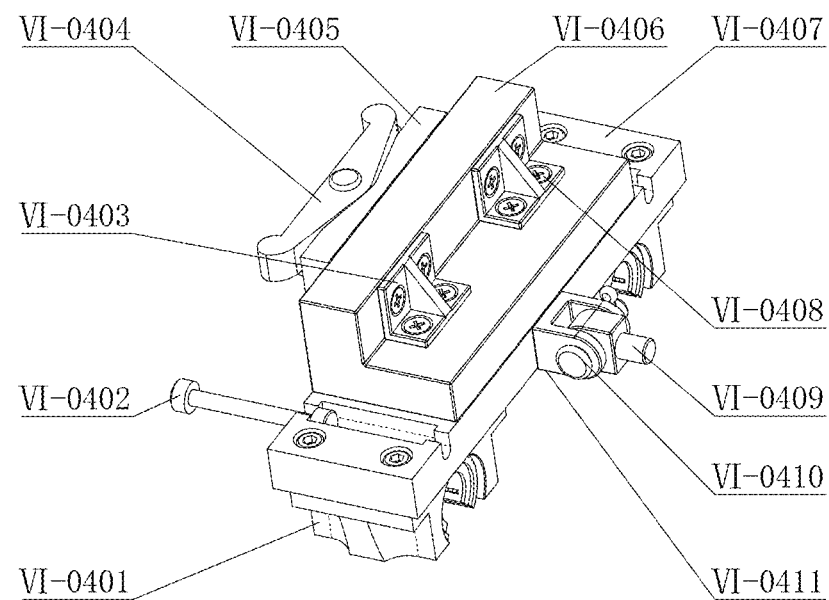
FIG. 31 is an axonometric drawing of a floating pressing assembly according to a second embodiment.

As shown in FIG. 31, connection methods of various components in the floating pressing assembly VI-04 are similar to that of the positioning and floating clamping assembly VI-03, with the difference that the floating pressing assembly VI-04 has no positioning element, does not clamp a workpiece, and only has the function of floating compressing. A stiffening plate VI-0403 is installed on a back plate VI-0406 and is connected by a cross countersunk screw VI-0408, which is used for improving strength and clamping stability of the back plate VI-0406. A bottom portion of a cover plate VI-0407 is fixedly provided with a linear bearing pedestal VI-0401 to match with the linear guide rails VI-07. The cover plate VI-0407 is provided with two grooves for a cylindrical pull rod VI-0402 to slide therein. A floating clamping base VI-0405 is fixedly arranged on the back plate VI-0406. The floating clamping base VI-0405 is connected to a floating clamping block VI-0404. The cover plate VI-0407 is also provided with a second hinge buckle VI-0411, and the two are connected by a thread. One end of a first hinge buckle VI-0409 is connected to the second hinge buckle VI-0411 by a pin shaft VI-0410, and the other end of the first hinge buckle VI-0409 is connected to the hydraulic cylinder VI-06 by a thread. A force provided by the hydraulic cylinder VI-06 is transmitted to the floating pressing assembly VI-04 through the first hinge buckle VI-0409.

Figure 32:
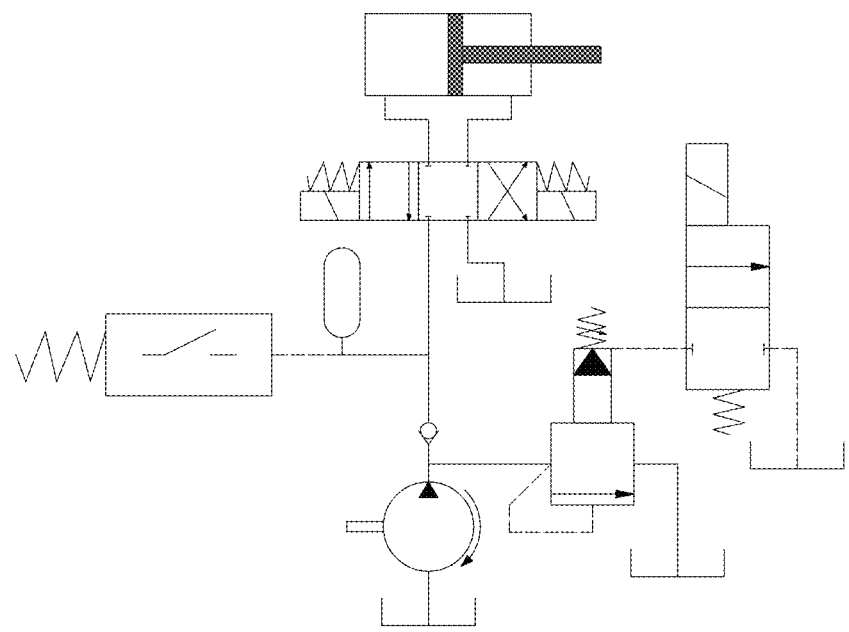
FIG. 32 is a diagram of a hydraulic system of the self-positioning floating clamping device.

As shown in FIG. 32, the hydraulic system adopts a pressure holding circuit using an energy accumulator. When a main reversing valve is working, the hydraulic cylinder moves forward and presses the workpiece, a pressure of an oil inlet circuit rises to a set value, a pressure relay sends a signal to energize a two-way valve, a pump is unloaded, a one-way valve is automatically closed, and the pressure of the hydraulic cylinder is maintained by the energy accumulator. When the pressure of the cylinder is insufficient, the pressure relay is reset to make the pump work again. A pulling force provided by the hydraulic cylinder is transmitted to the pull rod IV-0909 through a piston rod, thus providing power for the whole self-positioning floating clamping device IV.

Figure 33:
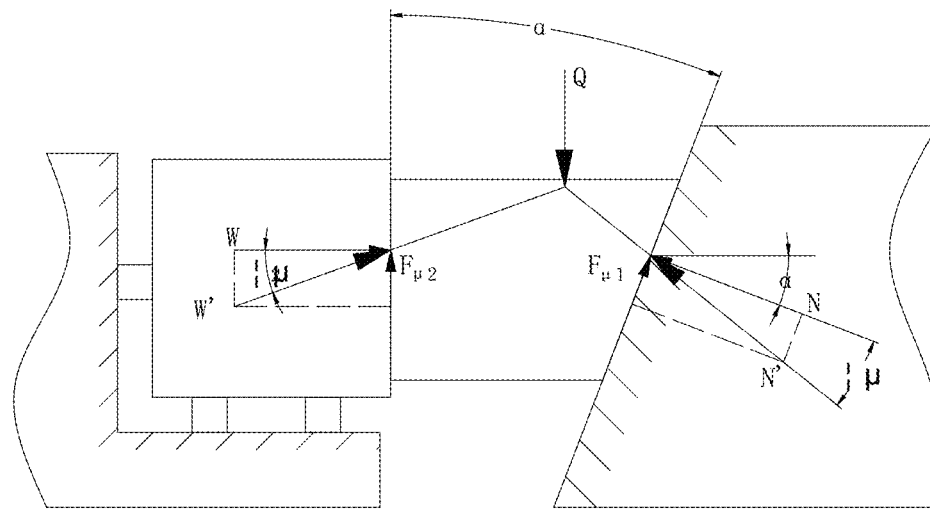
FIG. 33 is a stress analysis diagram of a workpiece according to the first embodiment.

As shown in FIG. 33, Q is the pulling force provided by the hydraulic cylinder IV-18, W' is an acting force of the workpiece III on the floating clamping base IV-0906, W is a reaction force of clamping, $F_{\mu 2}$ is a friction force, N is a reaction force, and $F_{\mu 1}$ is a friction force. According to an equation of static equilibrium:

$$\sum X = 0 \quad N'\cos(\alpha + \varphi_1) - W'\cos\varphi_2 = 0 \tag{1}$$

$$\sum Y = 0 \quad Q - N'\sin(\alpha + \varphi_1) - W'\sin\varphi_2 = 0 \tag{2}$$

$$W = W'\cos\varphi_2 = N'\cos(\alpha + \varphi_1) \tag{3}$$

$$W' = \frac{W}{\cos\varphi_2} \tag{4}$$

$$N' = \frac{W}{\cos(\alpha + \varphi_1)} \tag{5}$$

the formula (5) is substitute into the formula (1):

$$Q - W\tan(\alpha+\varphi_1) - W\tan\varphi_2 = 0 \tag{6}$$

$$Q = W[\tan(\alpha+\varphi_1) + \tan\varphi_2] \tag{7}$$

An exponential formula of a cutting force is obtained through a large number of experiments, after the cutting force is measured by a dynamometer, the obtained data is processed by a mathematical method, and an empirical formula for calculating the cutting force can be obtained.

According to an empirical formula for milling force calculation: F is a milling force, $C_p$ is a type coefficient of a milling cutter, $a_p$ is a milling depth, $f_z$ is a feed per tooth, d is a diameter of the milling cutter, B is a milling width, z is a number of teeth of the milling cutter, and $K_p$ is a coefficient of correction;

$$F = C_p a_p^{0.86} f_z^{0.72} d^{-0.86} B \cdot z K_p \tag{8}$$

Therefore, a clamping force needed by the workpiece $$Q = C_p a_p^{0.86} f_z^{0.72} d^{-0.86} B \cdot z K_p [\tan(\alpha+\varphi_1) + \tan\varphi_2] \tag{9}$$

is the pulling force Q needing to be provided by the hydraulic cylinder in the self-positioning floating clamping system.

Figure 34:
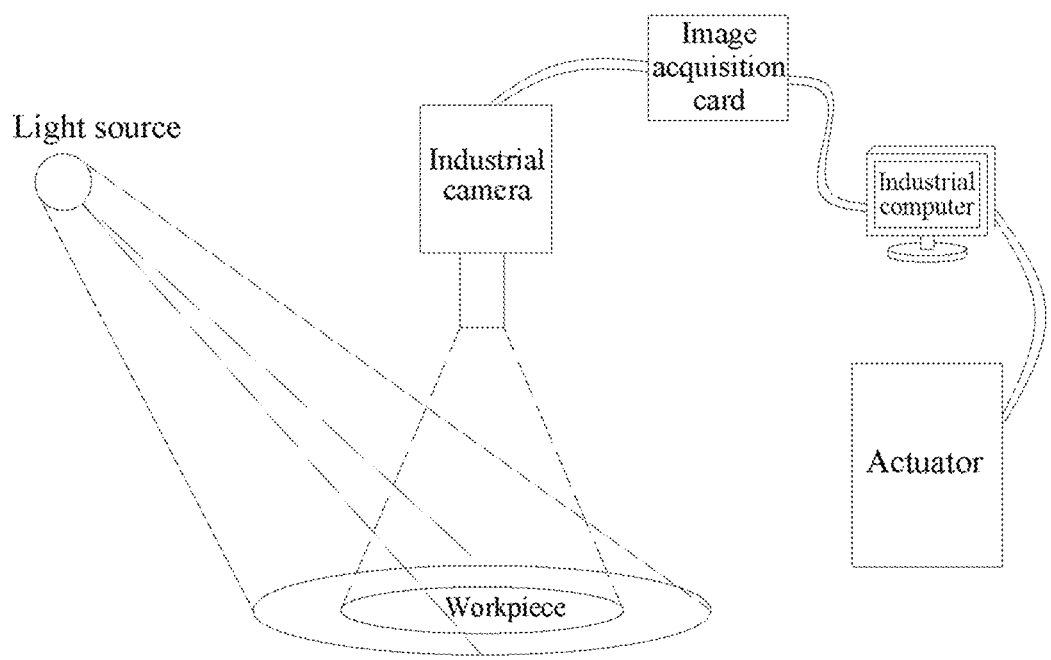
FIG. 34 is a working diagram of a machine vision system;
in the drawings: I refers to a linear motion device, II refers to a workpiece automatic flip device, III refers to a workpiece, IV refers to a self-positioning floating clamping device, and V refers to an industrial camera.

A working principle of the machine vision system is shown in FIG. 34. An illumination system provides light source illumination for the workpiece, and the industrial camera V collects an image of the workpiece III, the industrial camera employs a CCD industrial camera which is used as an input device, which collects image information during machining and transmits the image information to the image acquisition card. After being processed by the image acquisition card, the information is transmitted to the industrial computer, and the industrial computer analyzes the processed information, determines the status of the workpiece, and gives different instructions to actuators such as the workpiece flip device and the self-positioning clamping device according to the status of the workpiece.

A working principle of the multi-station self-positioning floating clamping and workpiece automatic flip intelligent fixture system according to the present disclosure is as follows:

A turning tool forging to be processed realizes six-point positioning of the workpiece through the A-type support nail and the C-type support nail on the fixture main plate, so that a machining position of the turning tool forging to be processed can be determined in the multi-station self-positioning floating clamping and workpiece automatic flip intelligent fixture system. The floating clamping assembly is powered by the thin-type hydraulic cylinder fixed on the fixture bottom plate, the thin-type cylinder drives the pull rod, and the pull rod drives two connecting rods connected by the connecting plate. A side face of the floating clamping base on the connecting rod is an inclined face, which contacts with an inclined face on the fixture main plate to form an inclined wedge clamping mechanism. The floating clamping block is hinged with the floating clamping base. Therefore, the floating clamping block can rotate freely, thus realizing the self-positioning clamping function.

When one face is milled, that is, one procedure is finished, the industrial camera of the machine vision detecting system collects image information in the machining process, and transmits an image signal to the computer. After image processing, the computer analyzes that the one procedure machining of the workpiece is finished, and gives instructions to a hydraulic pump and an air pump, wherein instructions to the rotary cylinder are delayed instructions. First, oil is fed to an oil inlet of the thin-type hydraulic cylinder to drive the mechanical claw to close and clamp the workpiece, and then the rotary cylinder moves to drive the mechanical claw clamped with the workpiece and the thin-type hydraulic cylinder to rotate by 90 degrees to make the workpiece reach a required positioning position in next procedure. When detecting that the position and the posture of the workpiece are changed, the industrial camera transmits the image data to the computer. The computer processes the image data and then sends a continuation instruction to the hydraulic pump, the thin-type hydraulic cylinder acts to drive the mechanical claw to release and put down the workpiece. After the mechanical claw puts down the workpiece, the industrial camera transmits the image signal to the computer, the computer processes the image, the workpiece has been positioned, and an instruction is given to the servo motor. The servo motor in the linear motion device works, and drives the ball screw to rotate through the coupler. The workpiece automatic flip device connected to the linear motion device immediately moves to an adjacent station, repeating the above-described workpiece flip action. After all the workpieces are positioned, the self-positioning floating clamping device applies a clamping force. Working principles and working flows of each station are the same as mentioned above.

A bottom portion of each station of the fixture main plate is provided with a travel groove hole, and one floating clamping assembly occupies positions of two workpieces at the same time, and can clamp two workpieces at a time. The connecting rod in the floating clamping assembly passes through the travel groove hole, and the connecting rod can swing in the travel groove hole. A top portion of the connecting rod is connected to the floating clamping base and the floating clamping block, while a bottom portion of the connecting rod is connected to the connecting plate. The left and right ends of the connecting plate are respectively connected to one connecting rod through hinge, and the connecting rod can rotate within a certain range, so that the clamping forces of the two stations can be balanced, and a gap is left between the floating clamping block and the floating clamping base, thus being convenient for the floating clamping block to rotate relative to the floating clamping base, thereby realizing self-positioning function and multi-point clamping, and ensuring that the clamping forces on each clamping point and each workpiece are equal.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

The above descriptions are merely preferred embodiments of this application and are not intended to limit this application. For those skilled in the art, this application may have various modifications and changes. Any modification, equivalent replacement, or improvement made without departing from the spirit and principle of this application shall fall within the protection scope of this application.

What is claimed is:

1. A multi-station self-positioning floating clamping and workpiece automatic flip intelligent fixture system, comprising a linear motion device, a workpiece automatic flip device, and a self-positioning floating clamping device, wherein:
   a bottom of the workpiece automatic flip device is connected to the linear motion device, and the linear motion device drives the workpiece automatic flip device to move horizontally;
   the self-positioning floating clamping device clamps a workpiece, the workpiece automatic flip device is arranged opposite to the self-positioning floating clamping device, and the workpiece automatic flip device is capable of clamping the workpiece and driving the workpiece to turn over;
   the workpiece automatic flip device comprises a rotary cylinder, the rotary cylinder is connected to a hydraulic cylinder, a piston rod of the hydraulic cylinder is connected to mechanical claw opening-and-closing fingers through a hinge mechanism, and the hydraulic cylinder reciprocates to drive the mechanical claw opening-and-closing finger to open and close to clamp or release the workpiece; and
   the self-positioning floating clamping device comprises a fixture bottom plate, a plurality of supporting plates are secured on the fixture bottom plate, a top portion of the supporting plate is fixedly connected to a fixture main plate, the fixture main plate is provided with a plurality of clamping stations, and every two of the clamping stations are provided with one floating clamping assembly, and the floating clamping assembly clamps or releases the workpiece.

2. The multi-station self-positioning floating clamping and workpiece automatic flip intelligent fixture system according to claim 1, wherein the mechanical claw opening-and-closing fingers are provided with two, and the two of the mechanical claw opening-and-closing fingers are oppositely arranged, the hinge mechanism is connected to a middle portion of the mechanical claw opening—and—closing finger, an end portion of the mechanical claw opening-and-closing finger is hinged to a hinge securing plate, and the hinge securing plate is secured to the hydraulic cylinder; the hinge mechanism comprises a hollow hinge buckle secured to the piston rod of the hydraulic cylinder, two ends of the hollow hinge buckle are hinged with a hinge buckle, and an end portion of the hinge buckle is hinged with the middle portion of the mechanical claw opening-and-closing finger.

3. The multi multi-station self-positioning floating clamping and workpiece automatic flip intelligent fixture system according to claim 1, wherein the mechanical claw opening-and-closing finger is a rod-shaped structure with a folded angle, a clamping end of the mechanical claw opening-and-closing finger is a wedge-shaped surface, and a cushion is fixedly arranged at the clamping end of the mechanical claw opening-and-closing finger.

4. The multi-station self-positioning floating clamping and workpiece automatic flip intelligent fixture system according to claim 1, wherein the floating clamping assembly comprises a vertically arranged pull rod, a bottom portion of the pull rod is connected to a hydraulic cylinder of the self-positioning floating clamping device, a top portion of the pull rod is hinged with a connecting plate, two ends of the connecting plate are hinged with vertical connecting rods, a top portion of each connecting rod is fixedly connected to a floating clamping base, the two floating clamping bases are oppositely arranged, and opposite sides of the floating clamping bases are each provided with a floating clamping block, the floating clamping blocks are capable of rotating around a joint with the floating clamping base, and the two floating clamping blocks clamp the workpiece.

5. The multi-station self-positioning floating clamping and workpiece automatic flip intelligent fixture system according to claim 4, wherein the floating clamping block is horizontally arranged, and two ends of the floating clamping block are each provided with a semicircular boss; an external side face of the floating clamping base is an inclined wedge surface, the fixture main plate is provided with a plurality of bumps, side surfaces of which are inclined wedge surfaces and are in contact fit with the inclined wedge surface of the floating clamping base.

6. The multi-station self-positioning floating clamping and workpiece automatic flip intelligent fixture system according to claim 1, wherein the self-positioning floating clamping device comprises a bottom plate, one end of the bottom plate is fixedly provided with a positioning supporting assembly and the other end of the bottom plate is provided with a floating pressing assembly, a plurality of positioning and floating clamping assemblies are arranged between the positioning supporting assembly and the floating pressing assembly, adjacent positioning and floating clamping assemblies clamp the workpiece, the floating pressing assembly is connected to the hydraulic cylinder, a linear guide rail is arranged on the bottom plate, and the positioning and floating clamping assembly and the floating pressing assembly are capable of moving horizontally along the linear guide rail.

7. The multi-station self-positioning floating clamping and workpiece automatic flip intelligent fixture system according to claim 6, wherein the positioning and floating clamping assembly comprises a linear bearing pedestal matched with the linear guide rail, a positioning plate is fixedly arranged on a top portion of the linear bearing pedestal, a side portion of the positioning plate is connected to a floating clamping block, and the floating clamping block is capable of rotating around a joint with the positioning plate.

8. The multi-station self-positioning floating clamping and workpiece automatic flip intelligent fixture system according to claim 1, wherein the linear motion device comprises a lower bottom plate, the lower bottom plate is provided with a linear guide rail and a ball screw in parallel, bottom portions of a plurality of parallel linear motion assemblies are connected to the linear guide rail and the ball screw, and the ball screw is connected to a servo motor; and each of the linear motion assemblies is connected to the workpiece automatic flip device.

9. The multi-station self-positioning floating clamping and workpiece automatic flip intelligent fixture system according to claim 1, further comprising a machine vision system, wherein the machine vision system comprises an industrial camera arranged above the self-positioning floating clamping device, the industrial camera is connected to an image acquisition card, the image acquisition card is connected to an industrial computer, the industrial camera collects image information of the workpiece and transmits the image information to the image acquisition card, the image acquisition card transmits the image information to the industrial computer, the industrial computer analyzes and processes the image information, determines a status of the workpiece, and controls the linear motion device, the workpiece automatic flip device and the self-positioning floating clamping device to operate.

\* \* \* \* \*